(12) United States Patent
Yokoyama

(10) Patent No.: US 8,437,021 B2
(45) Date of Patent: May 7, 2013

(54) PRINTING SYSTEM AND PROGRAM FOR PROCESSING SECURE PRINT JOBS USING A SECURITY-UNAWARE PRINTER

(75) Inventor: Hidehiko Yokoyama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1181 days.

(21) Appl. No.: 11/751,834

(22) Filed: May 22, 2007

(65) Prior Publication Data

US 2007/0268518 A1    Nov. 22, 2007

(30) Foreign Application Priority Data

May 22, 2006 (JP) ................ 2006-141622
Apr. 10, 2007 (JP) ................ 2007-102944

(51) Int. Cl.
*G06F 3/1296* (2006.01)
*G06F 21/31* (2006.01)
*G06K 15/00* (2006.01)
*H04L 63/08* (2006.01)
*H04L 63/0281* (2006.01)

(52) U.S. Cl.
USPC ............... 358/1.15; 358/1.14; 726/2; 726/12; 726/17

(58) Field of Classification Search ............ None
See application file for complete search history.

(56) References Cited

U.S. PATENT DOCUMENTS

| 6,865,679 | B1 | 3/2005 | Dennison |
| 2001/0049666 | A1 | 12/2001 | Prakken et al. |
| 2002/0097431 | A1 | 7/2002 | Ikegami |
| 2003/0002077 | A1* | 1/2003 | Shima .................. 358/1.15 |
| 2003/0069915 | A1 | 4/2003 | Clough et al. |
| 2004/0075860 | A1* | 4/2004 | Shima et al. ........... 358/1.15 |
| 2005/0094202 | A1* | 5/2005 | Saeki .................. 358/1.15 |
| 2005/0151994 | A1* | 7/2005 | Takahashi ............. 358/1.15 |
| 2005/0231759 | A1* | 10/2005 | Kamijima .............. 358/1.15 |
| 2006/0077420 | A1* | 4/2006 | Okamoto et al. ........ 358/1.14 |
| 2006/0256370 | A1* | 11/2006 | Murakawa .............. 358/1.15 |
| 2006/0271500 | A1* | 11/2006 | Obrea et al. ............. 705/76 |
| 2007/0127069 | A1* | 6/2007 | Steele et al. ............ 358/1.16 |
| 2010/0141978 | A1* | 6/2010 | Nomura et al. .......... 358/1.14 |

FOREIGN PATENT DOCUMENTS

| CN | 1358378 A | 7/2002 |
| JP | 2000-035871 A | 2/2000 |
| JP | 2002-041443 | 2/2002 |
| JP | 2002-215346 A | 8/2002 |
| JP | 2003-308194 A | 10/2003 |
| KR | 2002-0024231 A | 3/2002 |
| KR | 2005-0075269 A | 7/2005 |

* cited by examiner

*Primary Examiner* — Fan Zhang
(74) *Attorney, Agent, or Firm* — Canon USA Inc. IP Division

(57) ABSTRACT

The present invention provides, to an image forming apparatus that cannot interpret access control information representing permission to execute printing, a mechanism for flexibly restricting a print job by using the access control information. Specifically, a proxy server verifies whether the access control information is valid. If the proxy server verifies that the access control information is valid, an ACT in the print job is deleted. The print job with the ACT deleted is queued. The queued print job is transmitted and printed out in the image forming apparatus.

17 Claims, 22 Drawing Sheets

FIG. 9A

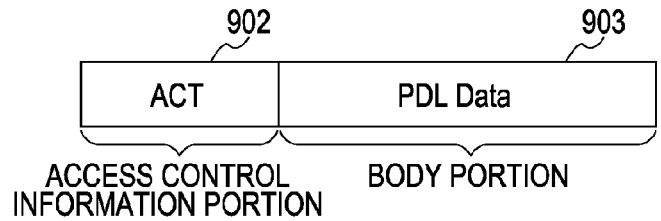

ACCESS CONTROL INFORMATION PORTION — 902 ACT
BODY PORTION — 903 PDL Data

FIG. 9B

```
<?xml version="1.0" encoding="UTF-8"?>
<ACT xmlns:xsi="http://www.w3.org/2001/XMLSchema-instance">
  <Version>0</Version>
  <UserInfo>
    <UserName>Taro</UserName>                                    ⎫
    <BaseRole> PowerUser </BaseRole>                             ⎬ 904
    <UserEmail> taro@xxx.yyy </UserEmail>                        ⎭
  </UserInfo>
  <DeviceInfo>
    <PrintSecurityLevel>0</PrintSecurityLevel>
  </DeviceInfo>
  <DeviceAccessControl>
    <AttributeCategory Name="DeviceCapabilityRestriction" CategoryStatus ="Static">  ⎫
      <saml:AttributeStatement>                                                       ⎪
        <saml:Attribute Name="PdlPrint">                                              ⎪
          <saml:AttributeValue Name="PdlPrintFlag">Permit</saml:AttributeValue>       ⎬ 905
          <saml:AttributeValue Name="ColorPrint">Color</saml:AttributeValue>          ⎪
          <saml:AttributeValue Name="Simplex">Deny</saml:AttributeValue>              ⎪
        </saml:Attribute>                                                             ⎭
      </saml:AttributeStatement>
    </AttributeCategory>
    <AttributeCategory Name="QuotaRestriction" CategoryStatus ="Dynamic">            ⎫
      <saml:AttributeStatement>                                                       ⎪
        <saml:Attribute Name="Print">                                                 ⎬ 906
          <saml:AttributeValue Name="ColorPrintTotal">1000</saml:AttributeValue>      ⎪
          <saml:AttributeValue Name="BwPrintTotal">1000</saml:AttributeValue>         ⎪
        </saml:Attribute>                                                             ⎭
      </saml:AttributeStatement>
    </AttributeCategory>
  </DeviceAccessControl>
</ACT>
```

FIG. 11

| | 1101 | 1102 | 1103 | 1104 | 1105 | 1106 | 1107 | 1108 |
|---|---|---|---|---|---|---|---|---|
| | ID | BW | COLOR | BW LIMIT | COLOR LIMIT | INJOB FLAG | INJOB BW | INJOB COLOR |
| | TARO | 94 | 87 | 100 | 100 | TRUE | 2 | 0 |
| | JIRO | 32 | 6 | 50 | 30 | FALSE | 0 | 0 |
| | HANAKO | 2 | – | 20 | – | FALSE | 0 | 0 |

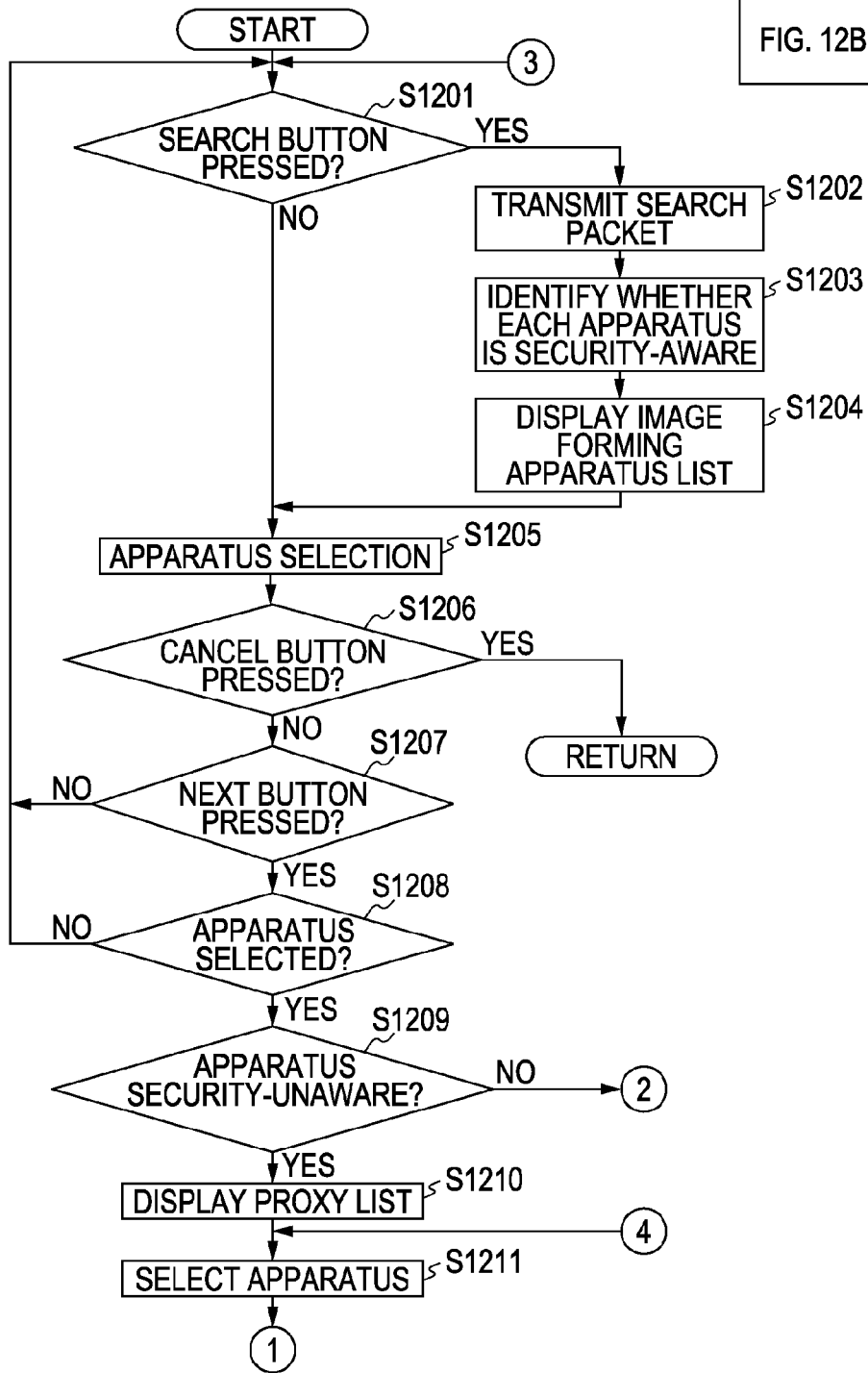

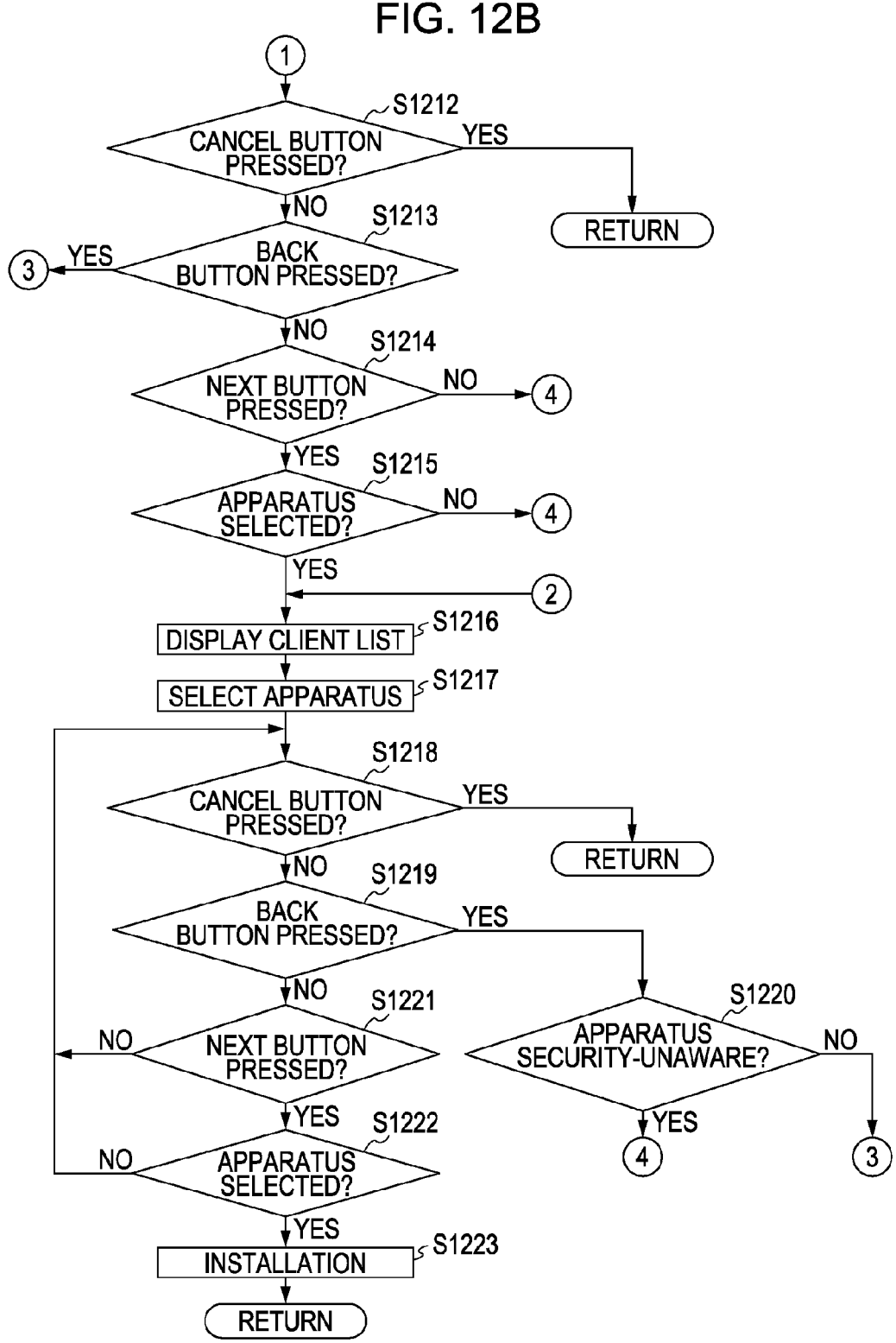

US 8,437,021 B2

PRINTING SYSTEM AND PROGRAM FOR PROCESSING SECURE PRINT JOBS USING A SECURITY-UNAWARE PRINTER

BACKGROUND OF THE INVENTION

1. Field of the Invention

The present invention relates to a mechanism for restricting execution of a print job.

2. Description of the Related Art

In recent years, security for network devices or print job restriction has been regarded as important, and various measures have been taken. There is no exception in printing system.

For example, Japanese Patent Laid-Open No. 2002-041443 discloses a technology in which, when a client PC (personal computer) transmits a print job to an image forming apparatus, a printing permission (ticket) authenticated by a server is acquired and input to the image forming apparatus with the print job. The ticket describes types of functions of the image forming apparatus that are permitted for use by a user who inputs the print job. On the basis of the ticket, the image forming apparatus flexibly restricts execution of the print job.

However, according to the technology of the related art in Japanese Patent Laid-Open No. 2002-041443, it is necessary for the image forming apparatus to have advanced functions such as a function of verifying the ticket added to the input print job. Accordingly, image forming apparatuses for use are limited. In other words, in an image forming apparatus that has no advanced function of interpreting the ticket or the like, execution of a print job cannot flexibly be restricted as described above.

By way of example, it is expected that similar functions of interpreting tickets are not provided in apparatuses such as image forming apparatuses of previous models, and inexpensive image forming apparatuses without advanced functions.

SUMMARY OF THE INVENTION

The present invention provides an information processing apparatus for transmitting a print job to an image forming apparatus. The information processing apparatus includes a detection unit configured to detect the access control information of the print job, the access control information representing permission of execution of the print job, a determination unit configured to determine whether or not the access control information detected by the detection unit is valid, a deletion unit configured to perform deleting the access control information detected by the detection unit and determined to be valid by the determination unit, and a transmission unit configured to transmit, to the image forming apparatus, the print job with the access control information deleted.

According to the present invention, a mechanism for flexible restricting execution of a print job can be provided to an image forming apparatus having no advanced function of interpreting the ticket, or the like, as described above.

Further features of the present invention will become apparent from the following description of exemplary embodiments with reference to the attached drawings.

BRIEF DESCRIPTION OF THE DRAWINGS

FIGS. 9A and 9B are illustrations of an example of a print job output from the client PC to the exterior.

FIG. 11 is a table showing examples of job execution restriction information and job execution record information for each user that are managed by the authentication server.

FIG. 12 (consisting of FIGS. 12A and 12B) is a flowchart showing an example of a printing system configuring process executed by using a management console.

DESCRIPTION OF THE EMBODIMENTS

Preferred embodiments of the present invention are exemplified below in detail with reference to the accompanying drawings. However, elements described in the embodiments are only exemplifications. Accordingly, the scope of the present invention is not limited to the embodiments.

First Embodiment
Overall Configuration of Printing System

Figure 1:
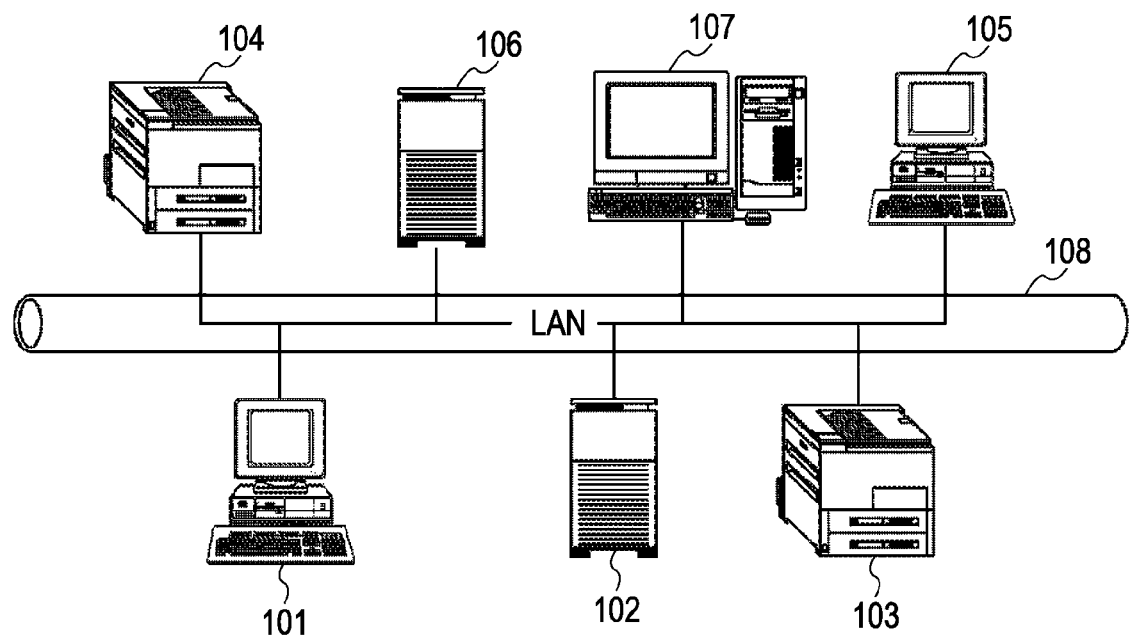
FIG. 1 is an illustration of an example of a hardware configuration of a printing system according to the present invention.

FIG. 1 is an illustration of an entire configuration of a printing system according to each of the following embodiments.

The printing system includes client computers (personal computers (PCs)) 101 and 105. Each client PC generates and outputs a print job to the exterior. The printing system also includes image forming apparatuses 103 and 104. Each image forming apparatus processes each of input various jobs and performs an operation such as recording onto paper. The printing system also includes an authentication server 102. The authentication server 102 authenticates job execution. The printing system also includes a system management server 107. The system management server 107 manages, in an integrated manner, the client PCs 101 and 105, the image forming apparatuses 103 and 104, and proxy server 106 (described later) included in the printing system. The proxy server 106 functions as a job control apparatus that, by mediating between one client PC and one image forming apparatus, outputs a print job from the client PC to the image forming apparatus. The apparatuses are connected to one another by a LAN (local area network) 108 complying with a communication standard of Ethernet. The apparatuses can perform mutual data communication.

In the first embodiment, the client PCs 101 and 105, the proxy server 106, and the system management server 107 are only names for description. Actually, these apparatuses can be formed by the same standard information processing apparatuses.

The following description exemplifies a LAN complying with a communication standard of Ethernet as a communication medium for mediating between apparatuses. However, the communication medium is not limited to an Ethernet LAN. For example, an Internet communication network, and a WAN (wide area network) including a plurality of LANs can be used. In addition, a so-called "wireless LAN" that performs wireless communication using radio waves and radiation in accordance with a standard such as IEEE (Institute of Electrical and Electronic Engineers) 802.11b can also be used. Furthermore, also a form in which apparatuses are connected by a local interface such as IEEE 1284 or USB (Universal Serial Bus) can be used.

Hardware of Information Processing Apparatus

Figure 2:
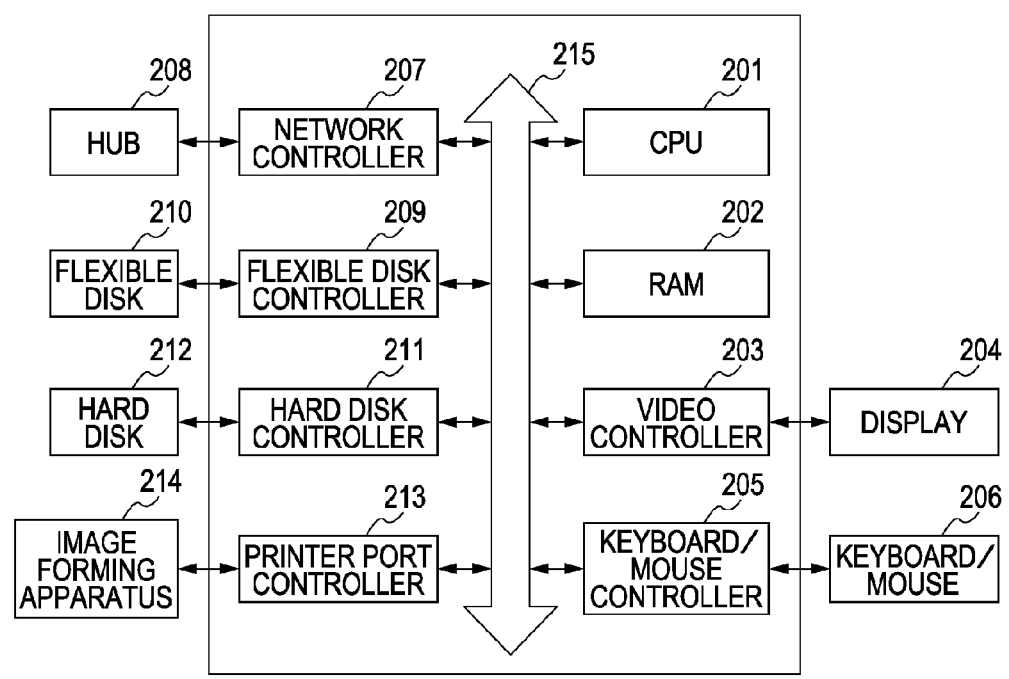
FIG. 2 is a block diagram showing an example of a hardware configuration of an information processing apparatus.

FIG. 2 is a block diagram showing an example of an internal configuration of each of the apparatuses 101, 102, 105 to 107 realizing an embodiment of the present invention. A CPU (central processing unit) 201 executes a program stored in a RAM (random access memory) 202 or the like. In addition, the CPU 201 loads, into the RAM 202, a program and data stored on a flexible disk 210 or hard disk 212 as a nonvolatile memory device, and stores the content of the RAM 202 in the flexible disk 210 or hard disk 212. Each of a flexible disk controller 209 and a hard disk controller 211 reads/writes data from/to a storage medium. A video controller 203 outputs visual information to a connected display 204. A keyboard/mouse 206 is an input device for inputting various types of data. Inputs from these devices are processed by a program running on the CPU 201 after passing through the keyboard/mouse controller 205. A network controller 207 is connected to the LAN 108 shown in FIG. 1 by a hub 208, and communicates with each apparatus on the network. In addition, under the control of the printer port controller 213, the apparatus can directly communicate with an image forming apparatus 214 connected to a printer port. The image forming apparatus 214 corresponds to one of the image forming apparatuses shown in FIG. 1. The CPU 201, the RAM 202, and each controller are connected to an internal bus 215, and exchanges control information and data.

Hardware of Image Forming Apparatus

Figure 3:
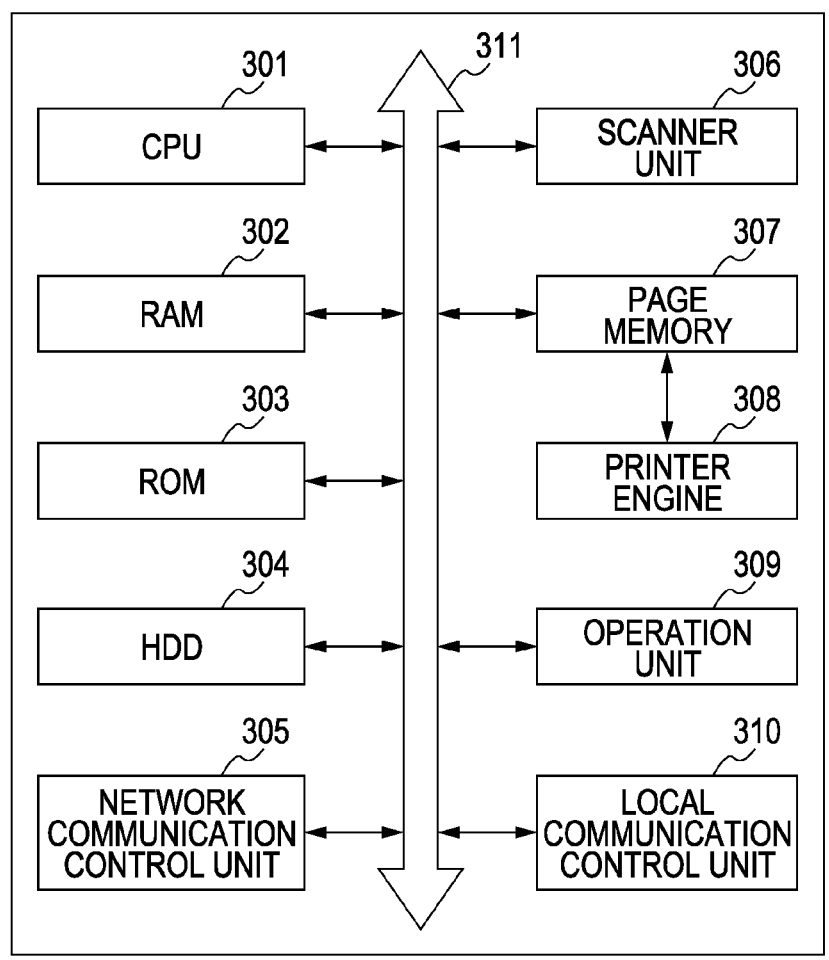
FIG. 3 is a block diagram showing an example of a hardware configuration of an image forming apparatus.

FIG. 3 is a block diagram showing hardware of an image forming apparatus in the first embodiment.

On the basis of a control program or the like stored in a ROM (read-only memory) 303 or hard disk 304, the CPU 301 of the image forming apparatus overall controls accessing of various types of devices connected to a system bus 311. In addition, the CPU 301 has a function of expanding an externally received page description language into image data in a format that is printable by a printer engine 308, and outputting the image data as output information to a page memory 307 connected through a video interface (not shown). A RAM 302 functions as a main memory, a work area, etc., for the CPU 301. The output information stored in the page memory 307 is printed onto a recording medium by the printer engine 308. A network communication control unit 305 exchanges various types of data with an external apparatus through a LAN. In addition, a local communication control unit 310 similarly exchanges various types of data with the rest of the system through a local communication party. An operation unit 309 includes a display panel and a keyboard. The operation unit 309 provides an operator with information, and receives instructions input by the operator.

Overall Printing System

Figure 4:
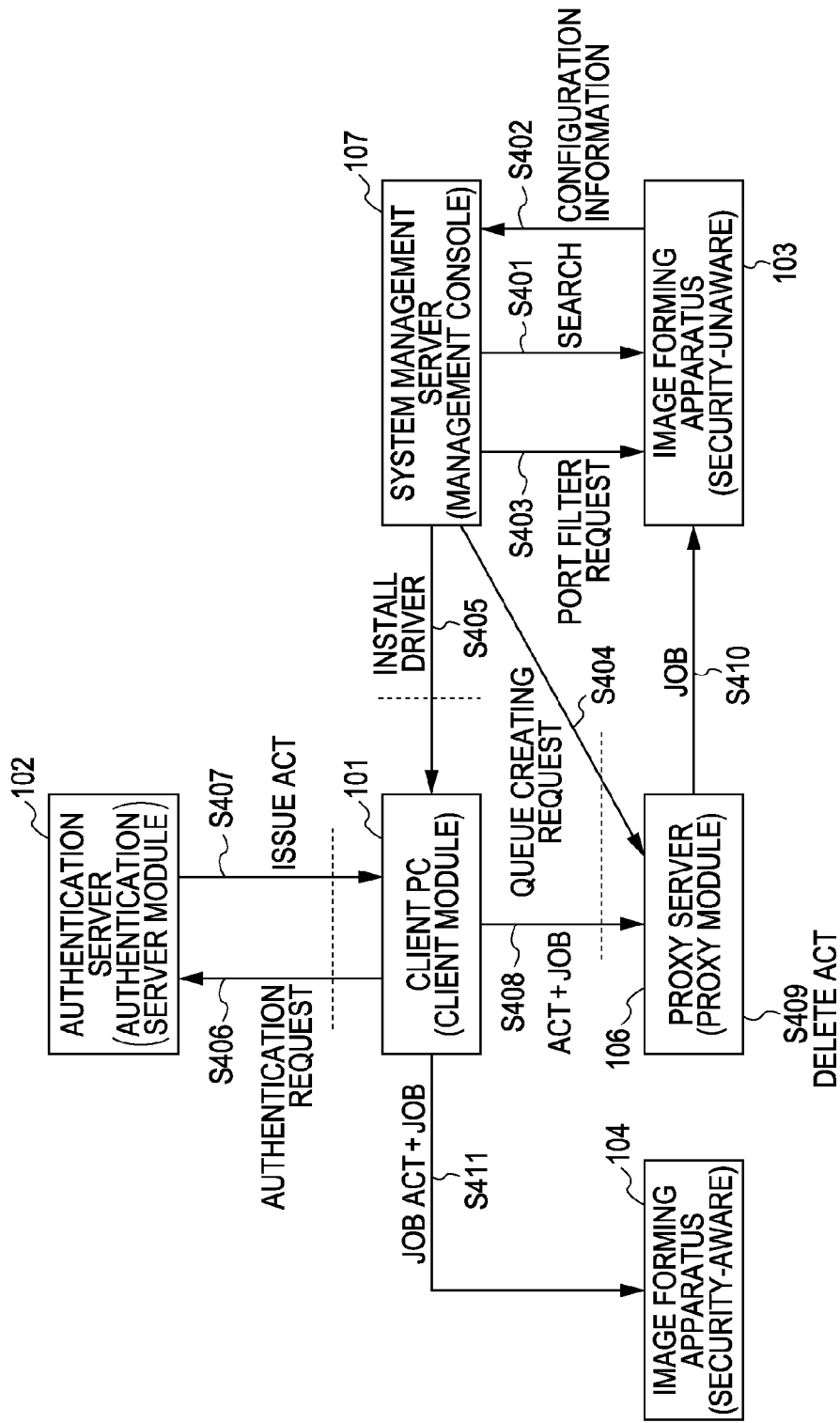
FIG. 4 is a block diagram showing an example of processing and information flow in the printing system shown in FIG. 1.

FIG. 4 is a schematic block diagram showing software function concepts of the apparatuses shown in FIG. 1. An outline of the flow of information between apparatuses in the printing system is described below with reference to FIG. 4.

The printing system is configured by steps S401 to S405. In step S401, the network is searched for an image forming apparatus from a management console. The management console is management software provided in the system management server 107. In the following description, each sentence having the management console as a subject indicates that the system management server 107 is a main processor.

In step S402, configuration information of various types is acquired from each image forming apparatus found by searching. On the basis of the acquired configuration information of the image forming apparatus, the management console identifies whether the image forming apparatus is security-supported. The configuration information includes at least information exemplified in FIG. 14 (described later), and information corresponding thereto.

In step S403, the identified image forming apparatus is requested by the management console 107 to set a port filter so that the image forming apparatus is prevented from receiving data from an apparatus different from the proxy server 106. For example, in step S403, the image forming apparatus is requested to set an IP (Internet protocol) block.

In step S404, the proxy server 106 is requested to create a queue for outputting a job. The queue is created by the proxy server 106 on the basis of the request in step S404, whereby a print job can be output to the image forming apparatus in step S410.

In step S405, a printer driver is delivered from the management console 107 to the client PC 101. The delivered printer driver includes a specification (such as an IP address, a MAC (media access control) address, or a device name) of an image forming apparatus serving as a final output destination (transmission destination), and a specification of the proxy server 106, which serves as a job output destination (transmission destination).

The proxy server 106 shown in FIG. 4 can be substituted by a common information processing apparatus. The proxy server 106 does not need to be particularly limited to a proxy server. Accordingly, the proxy server 106 is used as an example for description.

Next, how a print job is input to the image forming apparatus in the printing system including steps S401 to S405 is described below.

When, in step S406, the client PC 101 is used to perform printing, the client PC 101 issues an authentication request to the authentication server 102. After receiving the authentication request, the authentication server 102 authenticates the authentication request. If the authentication server 102 detects no problem, in step S407, the authentication server 102 issues an access control token (abbreviated as an "ACT") as access control information. In step S408 or S411, the client PC 101 combines the ACT acquired from the authentication server 102 and a created print job, and transmits the combination to the output destination.

When the image forming apparatus 103, which is security-unsupported, is specified as a final job input destination, the proxy server 106 is set as a job output (transmission) destination from the client PC 101. After receiving data corresponding to step S408, in step S1807 (described later), the proxy server 106 verifies whether the ACT is valid. If the proxy server 106 has verified the validity of the ACT, in step S409, the proxy server 106 executes processing for deleting the ACT. In step S410, the print job with the ACT deleted is transmitted to the image forming apparatus 103 by the proxy server 106. The image forming apparatus 103 processes the job received correspondingly to step S410, and prints out the result of processing.

When the image forming apparatus 104, which is security-supported, is specified as the job input destination, the client PC 101 does not delete the ACT. In step S411, the client PC 101 transmits, to the image forming apparatus 104, the print job in a form combined with the ACT.

The access control information is more specifically described below. The access control information includes at least the following two functions. One is that the access control information includes information indicating that the print job input to a device is reliable data. For example, a hash value indicating that data has not been tampered with, and a digital signature representing an issuer are included. A device that analyzes an ACT recognizes, on the basis of these pieces of information, that the ACT is valid. The other one is that the access control information has a function as restriction information or job execution permission. After verifying that the ACT is reliable, the device restricts or suppresses job execution (service) on the basis of a printing function whose execution may be permitted, the printing function being further described in the ACT.

In the following description, the ACT is used as the access control information. Any information having at least one of the above two functions may comprise the access control information.

The dotted lines shown in FIG. 4 indicate boundaries of software functions of computers. In general, in the same computer, process boundaries exist, and, between different computers, network boundaries exist. Each boundary indicated by the dotted line indicates one of a process boundary or a network boundary. Although, for example, the authentication server 102 and the management console 107 are shown as different apparatuses in FIG. 4, the printing system can be formed by including the authentication server 102 and the management console 107 in a single client computer.

Software Functions of Client Software

Figure 5:
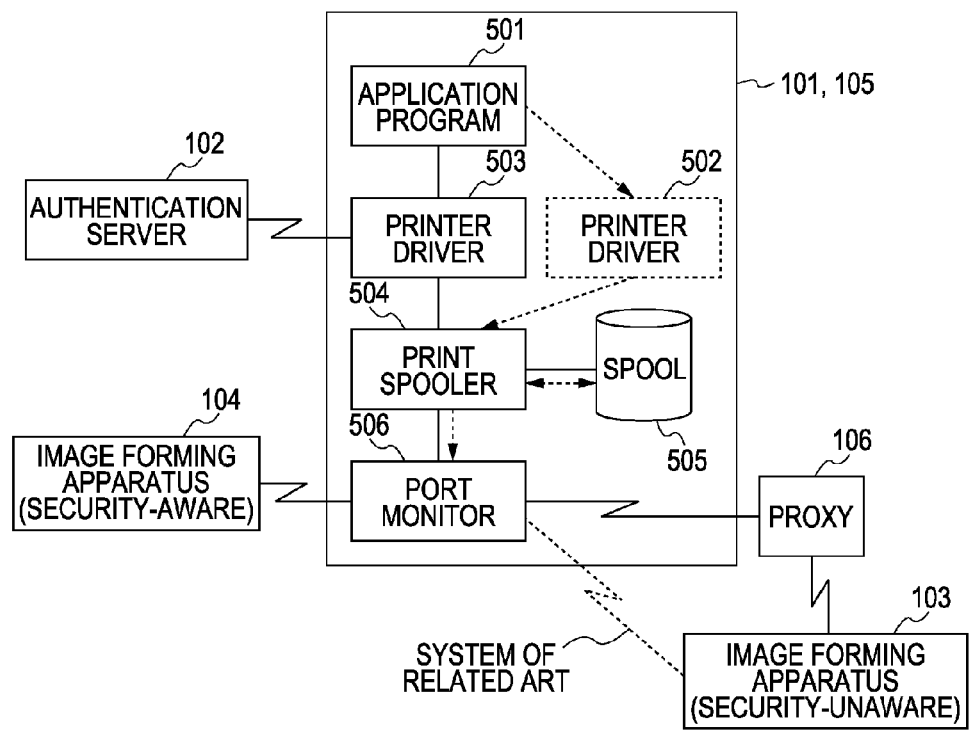
FIG. 5 is a functional block diagram showing an example of software in a client PC.

FIG. 5 is a functional block diagram showing software functions of a client PC in the first embodiment.

When receiving a printing request from an application program 501, a printer driver 503 transmits, to the authentication server 102, an authentication request including user authentication information such as a user name and a password, and an identifier of the image forming apparatus 104. After receiving the authentication request, by checking whether the authentication information has been registered beforehand, the authentication server 102 determines whether the authentication information is appropriate. If the authentication information is appropriate, the authentication server 102 sends back the ACT as the access control information. Alternatively, if the authentication information is not appropriate, the authentication server 102 sends back an error. What type of restriction (or permission) is set for each piece of authentication information for creating an ACT is described in detail with reference to FIG. 11 (described later).

After receiving the ACT, the printer driver 503 generates a print job with the ACT by adding the ACT to a print job generated on the basis of a printing instruction from the application program 501. The printer driver 503 temporarily stores the print job with the ACT in a spool 505. The temporarily stored print job is transmitted when an apparatus as an output destination becomes capable of reception.

Software Functions of Security-Supported Image Forming Apparatus

Figure 6A:
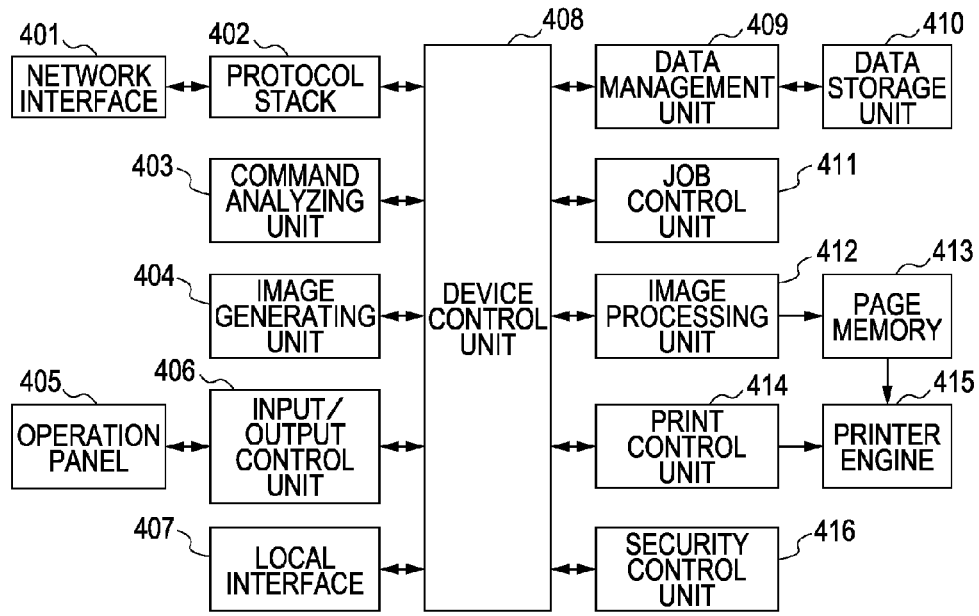
FIGS. 6A and 6B are functional block diagrams showing examples of software in an image forming apparatus.
Figure 6B:
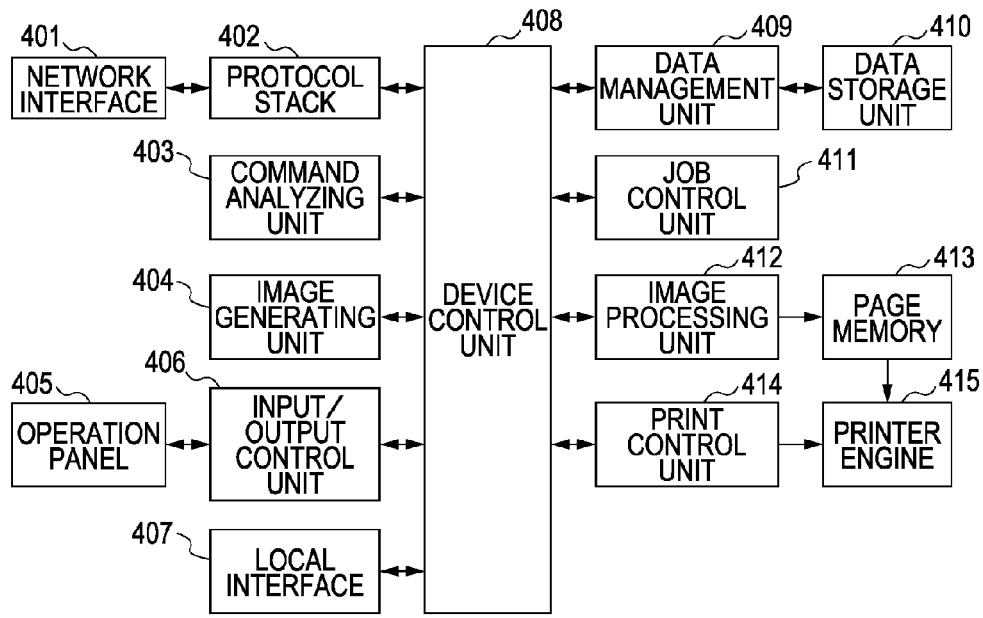

FIGS. 6A and 6B are block diagrams showing software functions of a security-supported image forming apparatus in the first embodiment. The security-support image forming apparatus corresponds to an image forming apparatus capable of interpreting access control information in the first embodiment. FIGS. 6A and 6B include some hardware blocks for description.

A network interface 401 is connected to the LAN 108 shown in FIG. 1, and performs data communication with different apparatuses similarly connected to the LAN 108. Data received through the network interface 401 is used for a protocol stack 402 to assemble data in accordance with each protocol layer, and, under mediation of a device control unit 408, the assembled data is sent and analyzed in a command analyzing unit 403.

In addition, the information processing apparatus has a local interface 407, such as IEEE 1284 or USB, other than the network interface 401. By connecting an information processing apparatus to the local interface 407, a processing request from the connected information processing apparatus can be received. Under mediation of the device control unit 408, data received through the local interface 407 is also sent and analyzed in the command analyzing unit 403.

When an analysis by the command analyzing unit 403 indicates that the received data is a print job including the ACT, a security control unit 416 checks encryption/decryption processing and an access right. The security control unit 416 has an ACT judgment function of judging whether the ACT is valid, that is, whether the ACT has not been tampered with. The security control unit 416 also has a print job attribute restricting function of restricting or suppressing execution of some function or functions of the print job on the basis of restriction or permission information described in the ACT, and subsequently notifying a post stage.

When the analysis of the command analyzing unit 403 identifies the received data as a print job (such as page description data or printing setting data) including no ACT, the data management unit 409 stores the received data in a print queue occupying a predetermined region of a data storage unit 410.

A job control unit 411 monitors the print queue of the data storage unit 410. When the job control unit 411 detects a print job, the job control unit 411 confirms whether printing is possible by querying a print control unit 414. If the printing is possible, print data included in a print job placed at the start of the print queue in the data storage unit 410 is transferred to an image processing unit 412.

The image processing unit 412 converts the print data into a print image for one page by performing various types of image processing. The generated print image for one page is transferred to a page memory 413. After detecting the print image in the page memory 413, a print control unit 414 instructs a printer engine 415 to print the content of the page memory 413 onto a printing medium. The print request is processed by repeatedly performing image processing of the image processing unit 412, expansion to the page memory 413, and printing of the printer engine 415.

In addition, an input/output control unit 406 acquires an image forming apparatus state from the device control unit 408, and the image generating unit 404 generates a display screen on the basis of the acquired state. After that, the image generating unit 404 displays the display screen on the operation panel 405. In addition, when the image generating unit 404 is notified by the operation panel 405 that (for example) contact of a user's finger has been detected, the image generating unit 404 performs processing associated with a screen element, such as a button, corresponding to a position of contact (for example on a touch sensitive screen).

Software Functions of Security-Unsupported Image Forming Apparatus

FIG. 6B is a software function block diagram of the security-unsupported image forming apparatus 103 in the first embodiment. The security-unsupported image forming apparatus 103 corresponds to an image forming apparatus that cannot interpret the access control information in the first embodiment. The security-unsupported image forming apparatus 103 shown in FIG. 6B differs from the image forming apparatus shown in FIG. 6A in that the security control unit 416 is not included. The other software functional blocks are not described in detail since they are similar to those shown in FIG. 6A. When the security-unsupported image forming apparatus 103 receives the above-described ACT, the image forming apparatus 103 regards the received ACT as an invalid command, discards the data, and sends back an error. Alternatively, the image forming apparatus 103 executes misprinting.

Software Functions of Proxy Server

Figure 7:
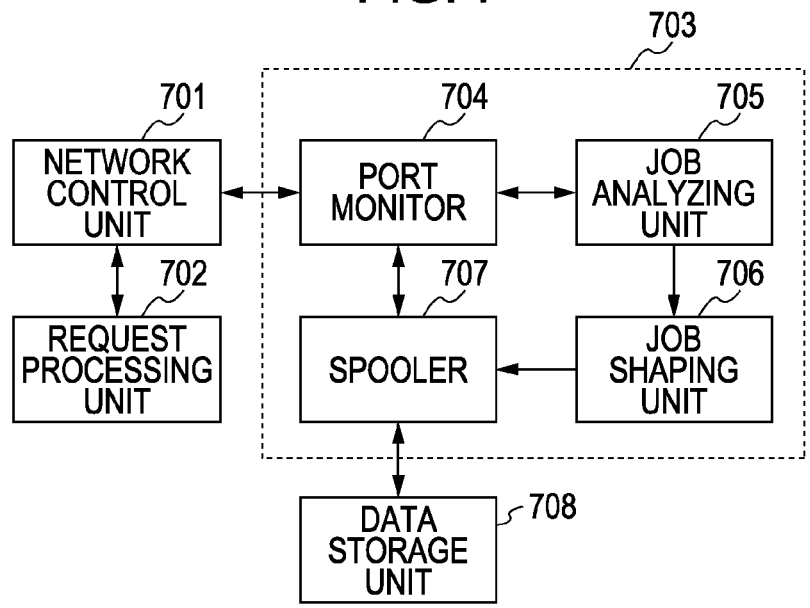
FIG. 7 is a functional block diagram showing an example of software in a proxy server.

FIG. 7 is a software functional block diagram of the proxy server 106 in the first embodiment.

A network control unit 701 transmits/receives data to/from an external apparatus through the LAN 108. When externally receiving a queue creating request through the network control unit 701, a request processing unit 702 installs a driver set 703 in the proxy server 106 so that a job is received. A port monitor 704 uses the network control unit 701 to perform job transmission and reception, image forming apparatus state acquisition, etc. A job analyzing unit 705 analyzes whether the received job has an appropriate format. If the received job does not have any appropriate format, processing concerning the job is finished by sending back an error. If the received job has the appropriate format, a job shaping unit 706 establishes consistency between the received job and details of restriction/permission described in an ACT. A spooler 707 stores the consistency-established job in a data storage unit 708 that is part of a storage device such as a hard disk. If the port monitor 704 determines that the image forming apparatus is able to receive the job, at the same time, the spooler 707 extracts the job from the data storage unit 708, and transmits the job to the image forming apparatus. In addition, the finishing processing concerning the job, which controls the inappropriate format job not to be transmitted, is described in detail with step S1807 (described later).

Authentication Request from Client PC

Figure 8:
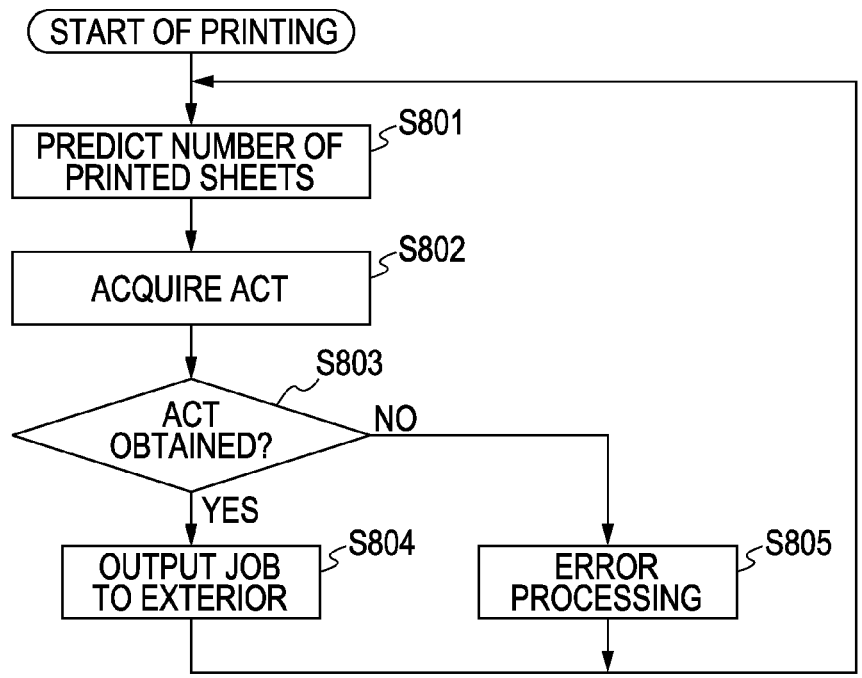
FIG. 8 is a flowchart showing an example of an operation process of the client PC in a printing mode.

FIG. 8 is a flowchart showing a printing operation of the client PC in the first embodiment. When the printing operation is started by a user's operation or the like, in step S801, the number of sheets produced by printing is predicted. The number of sheets by printing can be predicted on the basis of a header description in original data transferred to the printer driver 503 for printing, or in such a manner that the printer driver analyzes drawing commands. Prediction in step S801 of the number of sheets produced by printing is optional. Even if the prediction is not performed, the sprit of the present invention is not damaged. A predicted number of sheets produced by printing can be stored as a temporary variable in the RAM 202 as a temporary storage area.

In step S802, the authentication server 102 is requested to issue an ACT. Specifically, packets for requesting issuance of an ACT are sent to the authentication server 102 through a communication unit. A response from the authentication server 102 is awaited. If the response is received, from received packets, received data is extracted and reconfigured before being stored in the RAM 202. In addition, when the authentication server 102 is requested to issue an ACT, the number of sheets predicted in step S801 is passed as an argument to the authentication server 102.

In step S803, it is determined whether the ACT has correctly been acquired from the authentication server 102 in step S802.

If the ACT has correctly been acquired, the printing operation proceeds to step S804. Alternatively, if it is determined on the basis of some reason that the ACT has not correctly been acquired, the printing operation proceeds to step S805. In step S804, the original data, which is to be printed, is converted into print data capable of being sent to the device, and the ACT acquired in step S802 is added to the print data. The obtained data is sent as print job data to an output destination. FIG. 9A shows an example of a print job format for sending the ACT (902) and the print data (903) as a set to the device.

Specific Example of Access Control Information

FIG. 9B is an illustration of an example of the content of the ACT in the first embodiment. This is acquired from the authentication server 102 in step S802 in FIG. 8 and corresponds to the access control information portion 902 shown in FIG. 9. Although, in the first embodiment, the ACT is described in an XML (Extensible Markup Language) format, the format of the ACT is not limited to the XML format.

As shown in FIG. 9B, a portion 904 represents information concerning a user who acquires this ACT. This example indicates that the user is Taro, that a roll called PowerUser is assigned to the user, and that a mail address is taro@xxx.yyy. A portion 905 describes a function whose execution is permitted in the image forming apparatus 103, 104, or the like, by the user who acquires this ACT. The portion 905 represents a function as restriction information or job execution permission of the ACT. In this example, a printing function called "PDL Print" is usable from a personal computer, and function restriction in printing describes permission to execute color printing, and no permission to execute one-side printing (indicated by Simplex).

A portion 906 describes an upper limit number of sheets produced by printing that is usable in the image forming apparatus 103, 104, or the like, by the user who acquires this ACT. In this example, an upper limit number of sheets produced by color printing is 1000 for the entire system, and an upper limit number of sheets produced by monochrome printing is 1000 for the entire system.

Operation of Authentication Server

Figure 10:
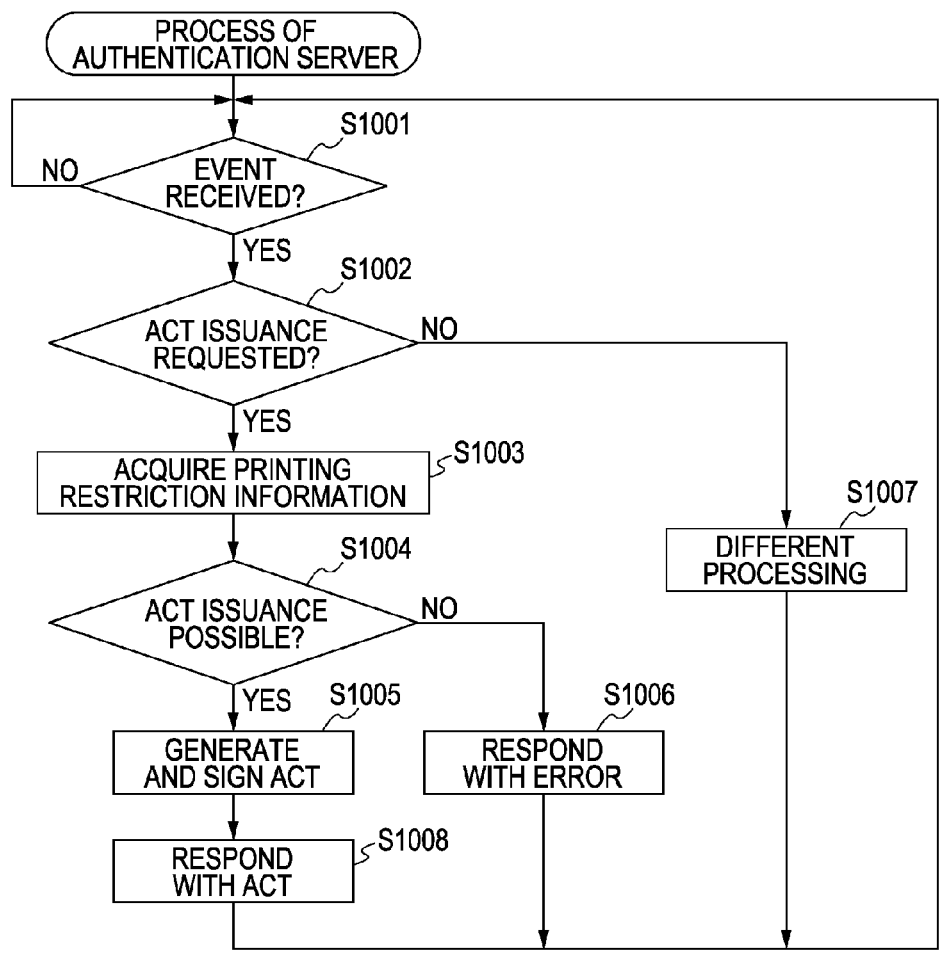
FIG. 10 is a flowchart showing an example of an operation process concerning access control information in an authentication server.

FIG. 10 is a flowchart showing an operation process of the authentication server 102 in the first embodiment.

In step S1001, issuance of an event is awaited. If the event has been issued, the operation proceeds to step S1002.

In step S1002, it is determined whether the event issued in step S1001 is an ACT issuing request including user authentication information. If it is determined that the issued event is the ACT issuing request, the operation proceeds to step S1003.

In step S1003, by communicating with the authentication server 102, the authentication server 102 is queried about the job restriction information shown in FIG. 11. Among pieces of the job restriction information shown in FIG. 11, a piece of job restriction information is referred to, the piece of job restriction information corresponding to user information specified on the basis of user authentication information included in the ACT issuing request. The job restriction information is stored in a storage area of the authentication server 102. Referring to the job restriction information may be performed in a form in which the job restriction information is directly referred to, and in a form in which the job restriction information, which is stored in a different information processing apparatus, for example, a database, is acquired by query.

In step S1004, on the basis of the job restriction information obtained in step S1003, it is determined whether an ACT can be issued. If it is determined that the ACT can be issued, the operation proceeds to step S1005.

In step S1005, the ACT shown in FIG. 9B is generated, and signing is performed on the generated ACT in order to guarantee its validity. In the signing, information, such as a digital signature encrypted with an encryption key and an ACT validity time limit, is generated. In step S1008, responding to the printer driver 503 with the ACT is performed. In verification of the validity of the ACT, both the digital signature and the validity time limit may be used, and either one may be used.

If, in step S1004, it is determined that the ACT cannot be issued, the operation proceeds to step S1006. In step S1006, the printer driver 503 is notified that the ACT cannot be issued.

After step S1006, S1007, or S1008 finishes, the operation returns to step S1001 and issuance of the next event is awaited.

Each User's Restriction Information and Job Record Information Managed by Authentication Server FIG. 11 shows user-unit function restriction and record information stored in a storage unit of the authentication server 102.

As shown in FIG. 11, a portion 1101 contains IDs of users registered in the system. In this example, three users, TARO, JIRO, and HANAKO, are registered. In a portion 1102, for each user, the number of sheets actually produced by monochrome printing is recorded. In a portion 1103, for each user, the number of sheets actually produced by color printing is recorded. The symbol "–" for HANAKO represents prohibition of color printing for the user "HANAKO". Each of portions 1104 and 1105 represents an upper limit number of sheets that can be produced by printing for each user. A portion 1106 contains user-job-issuance-state flags, each representing a time from ACT issuance to a user through completion of printing. In a portion 1107, for each user, a predicted number of sheets of paper to be used in monochrome mode in printing being presently executed by the user is described. Similarly, in a portion 1108, for each user, a predicted number of sheets of paper to be used in color mode in printing being presently executed by the user is described.

In FIG. 11, monochrome printing and color printing have been described as examples of functions of the image forming apparatus. However, various functions of the image forming apparatus, for example, such as stapling and one-side printing, may be described as function information.

Operation of System Management Server

FIG. 12 is a flowchart showing an operation process of the management console 107 in the first embodiment. The operation of the management console 107 is described below by also using FIGS. 13 to 17.

Search for Security-Support Image Forming Apparatus

In step S1201, it is determined whether a search instruction has been input by a user. This search instruction is executed, for example, by pressing a search button 803 on a screen displayed on the management console 107. At this time, after receiving SNMP (Simple Network Management Protocol) broadcast packets, the image forming apparatuses 103 and 104 send responses to the management console 107. Although exchange of various types of information by using SNMP is described, a different protocol can be used. For example, various types of information can be acquired by using the HTTP GET method, and various settings can be configured by using the HTTP POST method.

The management console 107 transmits an SNMP packet to each image forming apparatus that responds to the search in step S1202, excluding an image forming apparatus that is under management, in order for the image forming apparatus to transmit its configuration information. After receiving the SNMP packet, the image forming apparatus sends back a response including specified configuration information to the management console 107.

In step S1203, by analyzing the response from each image forming apparatus, it is identified whether the image forming apparatus is security-supported. On the basis of the result of identifying in step S1204, image forming apparatuses that send back configuration information are displayed on the image forming apparatus list 801 shown in FIG. 13. In the field 802 shown in FIG. 13, a result of identifying is displayed.

In step S1205, image forming apparatus selecting is performed. The selecting indicates that, by using a mouse to click on a selected field or pressing a select button 805, on the image forming apparatus list 801, a highlighted item (corresponding to the field 802 in FIG. 13) is selected as an image forming apparatus that performs the next processing. In addition, by pressing a detail button 807 when highlighted, acquired configuration information can be viewed. In addition, on a filter setting screen (not shown) that is displayed by pressing a filter button 806, items displayed on the image forming apparatus list 801 can arbitrarily be altered. By pressing a cancel button 809 (YES in step S1206), the process is finished.

Figure 13:
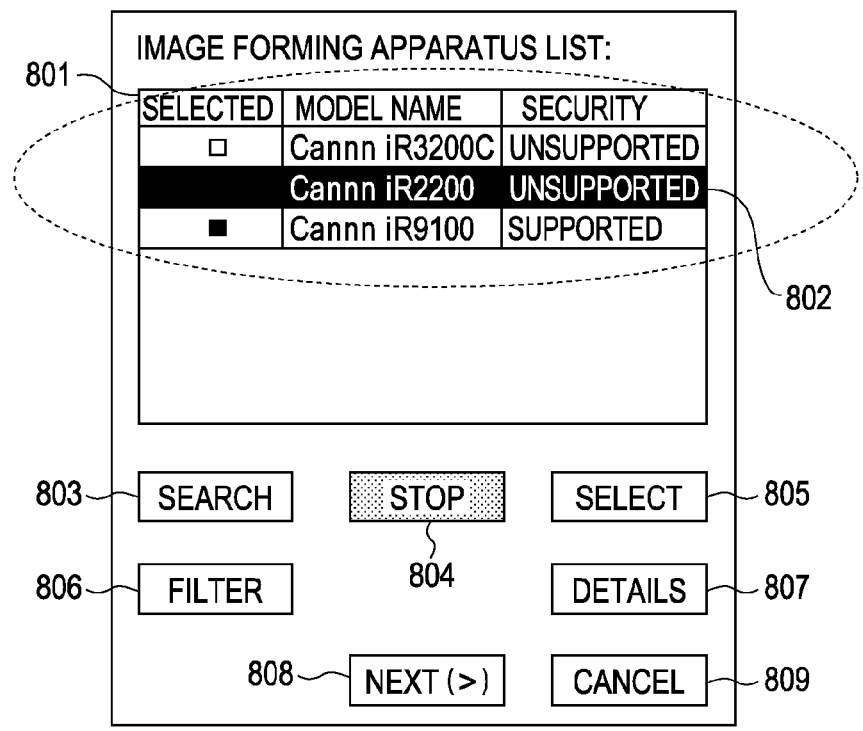
FIG. 13 is an illustration of an example of a setting screen in configuring the printing system.
Figure 16:
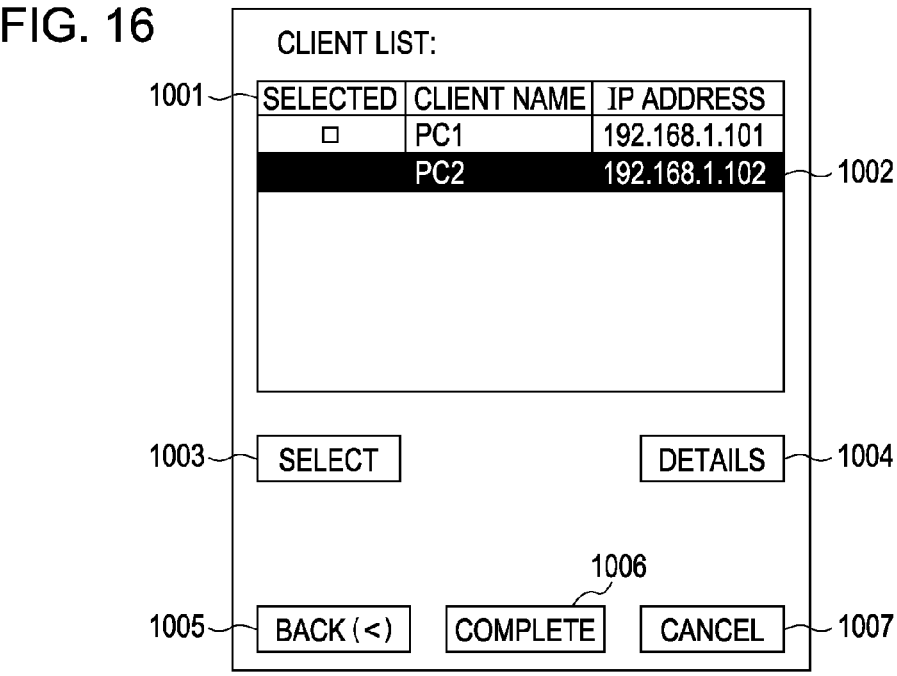
FIG. 16 is an illustration of an example of a setting screen for configuring the printing system.

In step S1207, it is determined whether the "NEXT (>)" button 808 shown in FIG. 13 has been pressed. By selecting, on the image forming apparatus list 801, an image forming apparatus whose configuration is needed ("YES" in step S1208), and pressing the "NEXT (>)" button 808, the management console 107 proceeds to step S1209. When all image forming apparatuses selected on the image forming apparatus list 801 in FIG. 13 are security-supported, the client configuration screen shown in FIG. 16 is displayed.

Search Packet and Response Packet

Figure 14:
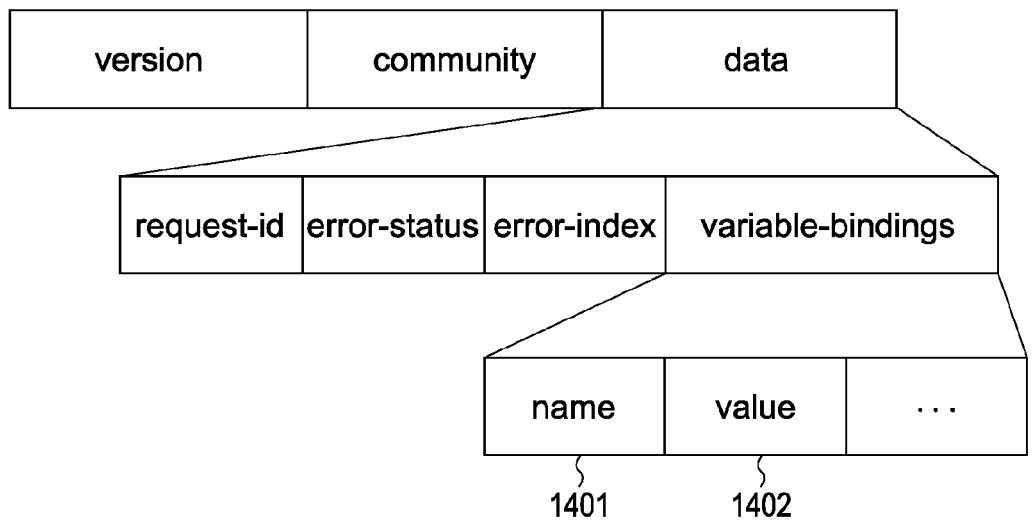
FIG. 14 is an illustration of an example of a search packet for searching for a security-support image forming apparatus, and a corresponding response packet.

FIG. 14 shows an example of a search packet and a response packet. FIG. 14 is a schematic illustration of an SNMP packet structure for use in searching for a security-support image forming apparatus. An SNMP packet includes version, community, and data fields. When MIB (Management Information Base) information is acquired from an image forming apparatus, GetRequest-PDU (Protocol Data Units) is used in the data field. A search packet is transmitted in a state in which, in the data field, OID (Object IDentifier) corresponding to MIB information acquired in a name field 1401 is set in a variable-bindings field, and NULL is set in a value field 1402. Accordingly, in a response packet sent from the image forming apparatus, when a value corresponding to the name field 1401 is set in the value field 1402 of GetResponse-PDU, an error code is set in an error-status field. Even if no specified OID exists, an error code is set in the error-status field. In other words, an SNMP GetRequest packet in which OID representing security-function-related MIB is set in the name field 1401 is transmitted to the image forming apparatus. When, in an SNMP GetResponse packet received as a response, noSuchName(2) is set in an error-status field, it is determined that the image forming apparatus is security-unsupported.

Selection of Proxy Server from List

In step S1209, it is determined whether the image forming apparatus selected in step S1208 is security-unsupported. If it is determined in step S1209 that the selected image forming apparatus is security-unsupported, in step S1210, a proxy server list is displayed.

Figure 15:
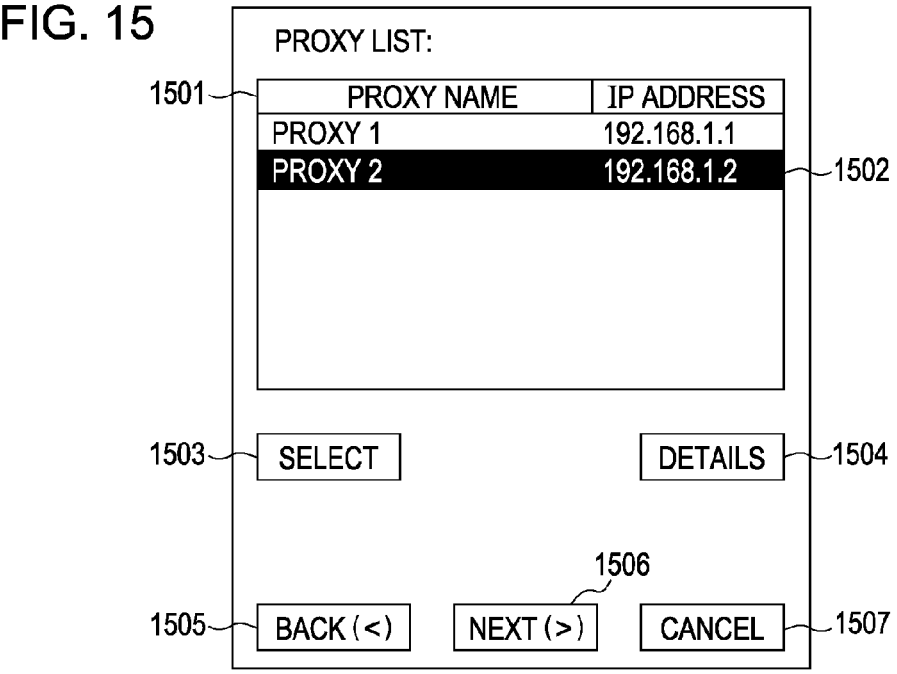
FIG. 15 is an illustration of an example of a setting screen for configuring the printing system.

FIG. 15 is an illustration of an example of a proxy server selection screen in the first embodiment. A proxy server list 1501 of proxy servers registered in the management console 107 beforehand is displayed. Registration of proxy server is described later.

In step S1211, by using the mouse to click on a portion of the proxy server list 1501, or pressing a select button 1503, with a cursor placed on the proxy server list 1501, a proxy server to be used can be selected. By pressing a detail button 1504, a proxy server detail dialog screen (not shown) is displayed, and proxy server information can be displayed.

By pressing a "BACK BUTTON (<)" 1505, the image forming apparatus configuration screen shown in FIG. 13 is displayed. By pressing a CANCEL button 1507, the process is finished.

By selecting a proxy server on the proxy server list 1501, a "NEXT (>)" button 1506 can be activated. By pressing the "NEXT (>)" button 1506, the client configuration screen shown in FIG. 16 is displayed.

Registration of Client PC

FIG. 16 shows an example of a setting screen for setting a client PC that allows participation to the printing system.

On a client list 1001, client PCs that are registered beforehand are displayed. By using the mouse to click or pressing a select button 1003, a client PC whose configuration is needed can be selected. By pressing a detail button 1004, with the client PC selected, client information can also be displayed. By pressing a "BACK (<)" button 1005, the proxy selection screen shown in FIG. 15 is displayed. When all the information processing apparatuses selected on the image forming apparatus list 801 are security-support, the information processing apparatus configuration screen shown in FIG. 13 is displayed. In addition, by pressing the CANCEL button 1007, the process is finished.

Setup Process of System Management Server

In step S1223, on the basis of screen settings that have been described, for each client PC, the management console 107 performs installation including delivery of a printer driver set, image forming apparatus setup, and various setting of proxy server. When an image forming apparatus (corresponding to the image forming apparatus 103) that is security-unsupported is selected on the image forming apparatus list in FIG. 13, in step S1223, an SNMP request for configuring network settings is issued to the image forming apparatus so that it can receive only a processing request from the selected proxy server 106. Accordingly, the image forming apparatus receives the processing request only from the proxy server 106. SNMP requests include, for example, MIB concerning IP block setting for rejecting reception of data from an IP address apparatus other than the proxy server 106.

In step S1223, the selected proxy server 106 is requested to generate a queue for decoding and storing a print job associated with the image forming apparatus. In addition, as described above, in step S1223, for the client PC selected on the client configuration screen shown in FIG. 16, delivery and installation of a printer driver set for inputting a print job to the image forming apparatus are performed. The printer driver set is configured to transmit a job generated by the printer driver not to the image forming apparatus but to the proxy server 106. In the described processing, a request of the client PC 101 for printing or the like can directly be sent to the image forming apparatus 104 that are security-supported, and can be sent to the image forming apparatus 103 that are security-unsupported via the proxy server 106.

Registration of Proxy Server

Figure 17:
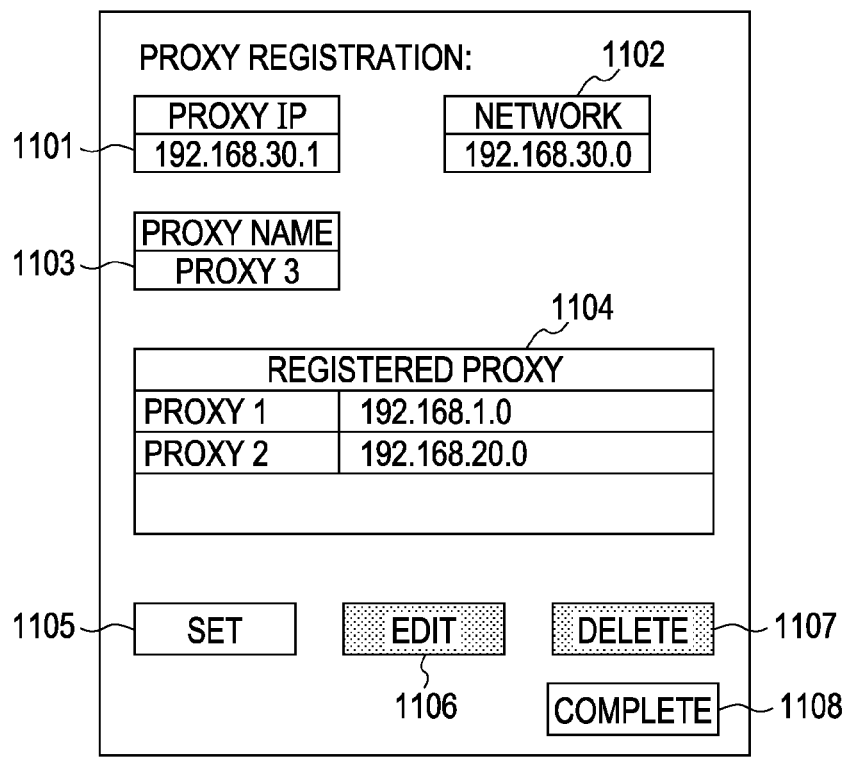
FIG. 17 is an illustration of an example of a setting screen for configuring the printing system.

FIG. 17 shows an example of a proxy server registration screen displayed on the management console 107 in the first embodiment. A field 1101 is used to input an IP address of a proxy server. The IP address can be arbitrarily by an operator. A field 1102 is used to input a network address to be associated with the proxy server. A field 1103 is used to input the name of the proxy server. By pressing a SET button 1105, with the fields 1101 to 1103 filled, the proxy server can newly be registered. The registered proxy server is displayed on a registered proxy server list 1104 and on the proxy server list 1501.

By selecting a proxy server from the registered proxy server list 1104, an EDIT button 1106 and a DELETE button 1107 are activated. By pressing the EDIT button 1106, settings of the presently selected proxy server are set in the proxy server IP in the field 1101, the network in the field 1102, and the server name in the field 1103. By altering some setting value, and pressing the SET button 1105, the settings of the selected proxy server can be altered. In addition, by pressing the DELETE button 1107, the presently selected proxy server can be deleted from among the registered proxy servers. By pressing a COMPLETE button 1108, this screen is closed.

Operation of Proxy Server

Figure 18:
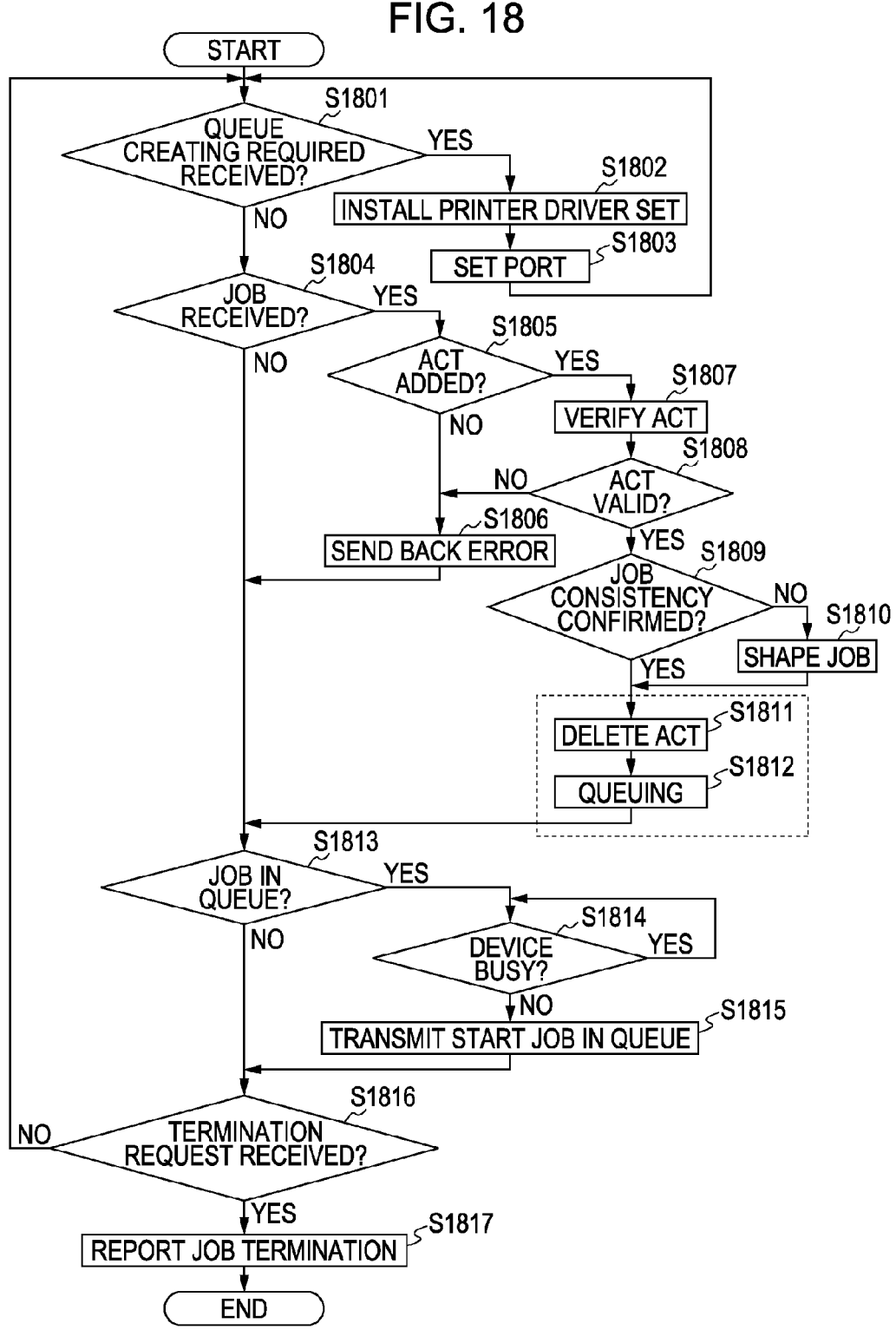
FIG. 18 is a flowchart showing an example of an operation process of a proxy server.

FIG. 18 is a flowchart illustrating an example of an operation process of a proxy server in the first embodiment. This operation corresponds to a case in which the proxy server 106 receives the print job (FIG. 4) to the image forming apparatus 103 that is security-unsupported, and executes step S410.

In step S1801, the proxy server 106 determines whether a queue creating request has been received from the management console 107. The queue creating request corresponds to the above-described steps S404 and S1223.

If the proxy server 106 has not received the queue creating request, the process proceeds to step S1804. If the proxy server 106 has received the queue creating request, in step S1802, installation of the printer driver set is performed. This installation represents installation of a printer driver set of a Windows system in queue creation when the print queue creating request is received from the management console 107. In step S1803, by setting an output destination of the port monitor to an image forming apparatus IP address included in the queue creating request, the creating is completed and the process proceeds to step S1801. The printer driver set represents the above-described job analyzing unit 705, job shaping unit 706, spooler 707, and port monitor 704 in FIG. 7.

In step S1804, it is determined whether a job has been received (input) from the client PC. If the job has not been received, the process proceeds to step S1813. The reception of the job may correspond to input of data read from a hard disk of the proxy server 106. If the job has been received, in step S1805, it is determined whether the job includes an added ACT. If the job does not include the ACT, in step S1806, an error is sent back to the client PC, and the process proceeds to step S1813. If, in step S1805, it is determined that the job includes the ACT, in step S1807, the ACT is verified. If, in step S1808, it is determined that the ACT is not valid, the process proceeds to step S1806 for sending back an error. Regarding identifying of the ACT, since, for example, a portion from the start to predetermined byte of the job includes an ACT identifier, by identifying the ACT identifier, it can be confirmed whether the ACT is included. Details are described later with reference to FIG. 20. The proxy server 106 may save the data of the job in hard disk 212 or discard the data of the job when the proxy server 106 executes processing of step S1804 and does not subsequently transmit the job to the image forming apparatus.

Verification in step S1807 of whether the ACT is valid is performed by verifying a digital signature included in the ACT, and by checking whether a validity period expires. For details, for example, an encrypted digital signature is decrypted by using a public key, and data obtained by decryption is sent back to the authentication server 102, which is a creator of the digital signature. The authentication server 102 receives the data and the data indicates that the ACT is valid, whereby it can be determined that the ACT is valid. In addition, after the encrypted digital signature is similarly decrypted by using the public key, if the present date and time of the ACT are within the validity period, it is determined the ACT is valid. In verification of the validity of the ACT, both a digital signature and a validity period may be used, or either one may be used.

Figure 19:
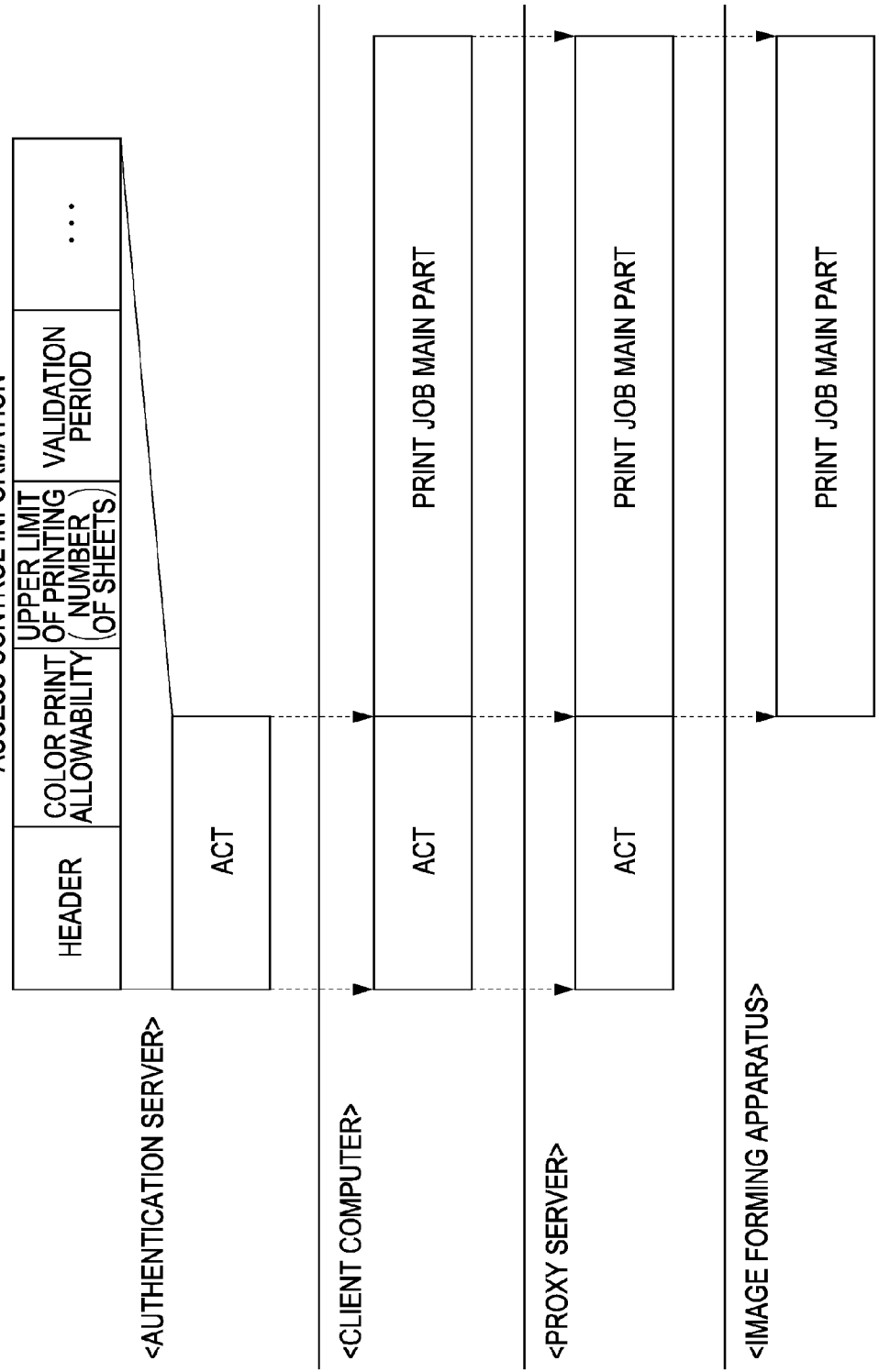
FIG. 19 is an illustration of an example of job processing in the proxy server.

If, in step S1808, the result of verification in step S1807 indicates that the ACT is valid, in step S1809, it is determined whether job consistency with restriction information of the ACT is established. For example, it is assumed that color printing is not set to be performed by the description of the restriction information of the ACT as shown in FIG. 9B. This corresponds to a case in which ColorPrint in the portion 905 in FIG. 9B is Deny. In this assumed case, if color setting of the job represents monochrome printing, it is determined that the job consistency is established. In addition, if the color setting of the job is color printing although color printing is set so as not to be performed in the description of the restriction information of the ACT, it is determined that the job consistency is not established. In this case, job shaping in step S1810 changes the color setting to monochrome printing before the process proceeds to step S1811. In step S1811, the ACT is deleted, and, in step S1812, the print job without the ACT is queued in a transmission queue (corresponding to the data storage unit 708 in FIG. 7). The deletion of the ACT in step S1811 is shown in FIG. 19.

Regarding the deletion of the ACT, when the print job is queued, it is necessary to determine a boundary between the ACT and the job. Here, a header portion of the ACT includes size information. Accordingly, on the basis of the size information, the start of the job can be detected.

If, in step S1809, it is determined that the job consistency is established, the process proceeds to queuing in step S1812 without processing the job.

In step S1813, it is determined whether the queued print job has been queued, and, in step S1814, it is determined whether the image forming apparatus 103 is capable of printing. At the time that it is determined the image forming apparatus 103 is capable of printing, in step S1815, the print job is transmitted from the start of the transmission queue.

In step S1816, the proxy server 106 determines whether a termination request has been received. If the proxy server 106 has received a termination request, proxy processing finishes. Until the proxy server 106 receives a termination request, steps S1801 to S1816 are repeatedly performed.

Figure 20:
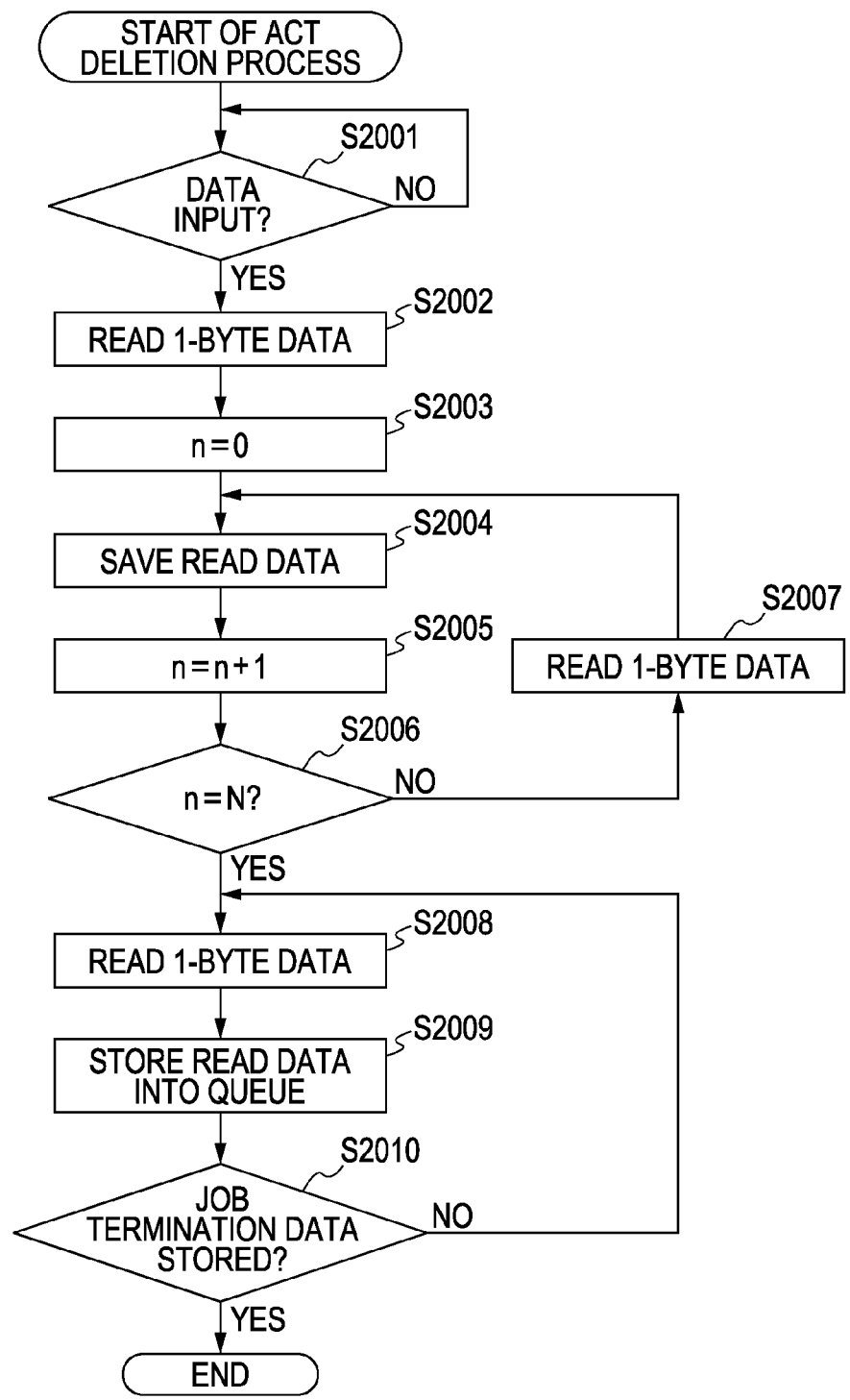
FIG. 20 is a flowchart showing an example of an access control information deleting process by the proxy server.

FIG. 20 is a detailed flowchart of the ACT deletion and print job queuing in steps S1811 and S1812 shown in FIG. 18.

In step S2001, it is determined whether data has been input. This indicates that the process has proceeded to step S1811 after step S1809 or S1810 in FIG. 18 finishes.

After each of steps S2002 to S2005 is performed, in step S2006, it is determined whether the amount of read data has reached N bytes. The data size of the ACT is represented by "N–1" bytes. When the data size of the ACT is 20 bytes, the process proceeds to step S2008 at the time the variable N reaches 21. In step S2004, the read data (ACT) is saved in order to prevent the ACT from being transmitted to the image forming apparatus. Since the ACT is saved in the storage unit until it is affirmatively determined in step S2006, by later reading and outputting a history of the saved ACT, a history of printing by the security-unsupported image forming apparatus via a proxy server can be viewed by an external apparatus or the like.

In step S2008 and thereafter, the read data is stored as a print jot in the transmission queue. If it is determined (YES in step S2010) that the entirety of the print job has been stored in the transmission queue, the process finishes.

According to the first embodiment, even for an image forming apparatus that cannot be provided with an advanced function of interpreting an ACT or the like, a mechanism for flexibly restricting a print job can be provided.

Figure 21:
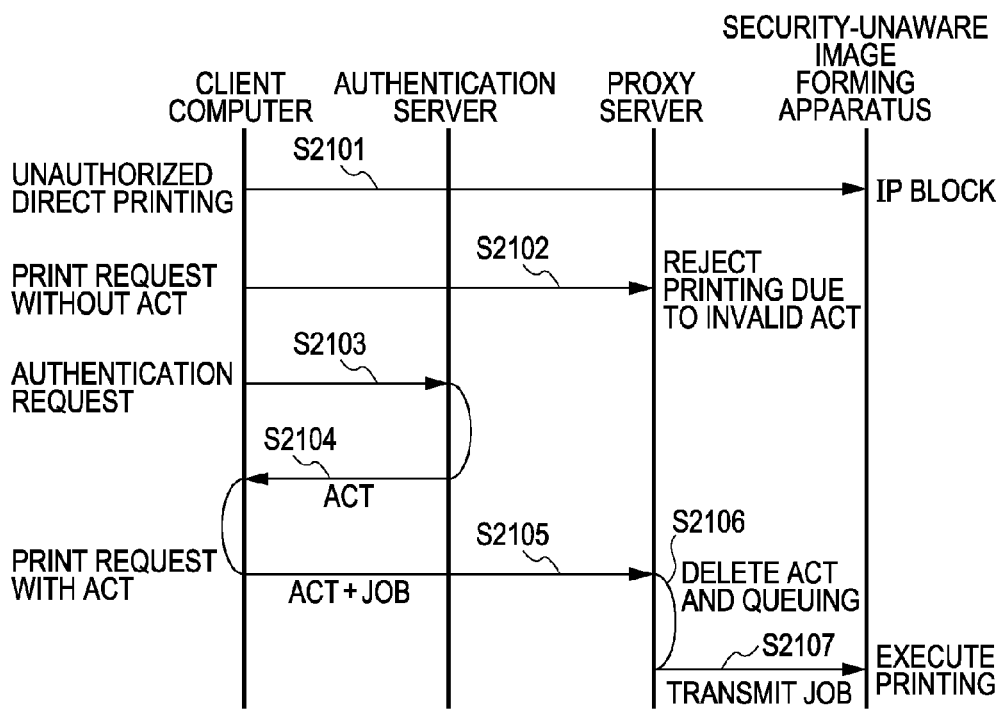
FIG. 21 is a sequence chart showing an example of input of a print job from each issuer in the printing system.

In addition, an image forming apparatus that is unable to interpret an ACT is set to reject reception of data from an apparatus different from a proxy server. A print job which includes no added ACT and which passes through no proxy server is prevented from being input to an image forming apparatus. Rejection of reception of data from the apparatus different from the proxy server is shown in step S2101 in FIG. 21. In addition, rejection of reception by the proxy server of a print job including no ACT is shown in step S2102.

Second Embodiment

In the first embodiment, a case in which, as shown in step S410 in FIG. 4, a print job is input to the image forming apparatus 103, which cannot interpret an ACT through the proxy server 106 has been described. However, another form can be assumed. A second embodiment of the present invention describes a case in which, even if a print job is input to an image forming apparatus capable of interpreting an ACT, the above-described proxy server 106 is used.

According to the second embodiment, print job processing requests are put together by the proxy server 106. Thus, when logs of print job execution records are collected, compared with the case of collecting information from each image forming apparatus, log collection can be simplified by collecting the information from the proxy server 106. In addition, a shortened collecting time and reduced network traffic can be realized.

Figure 22:
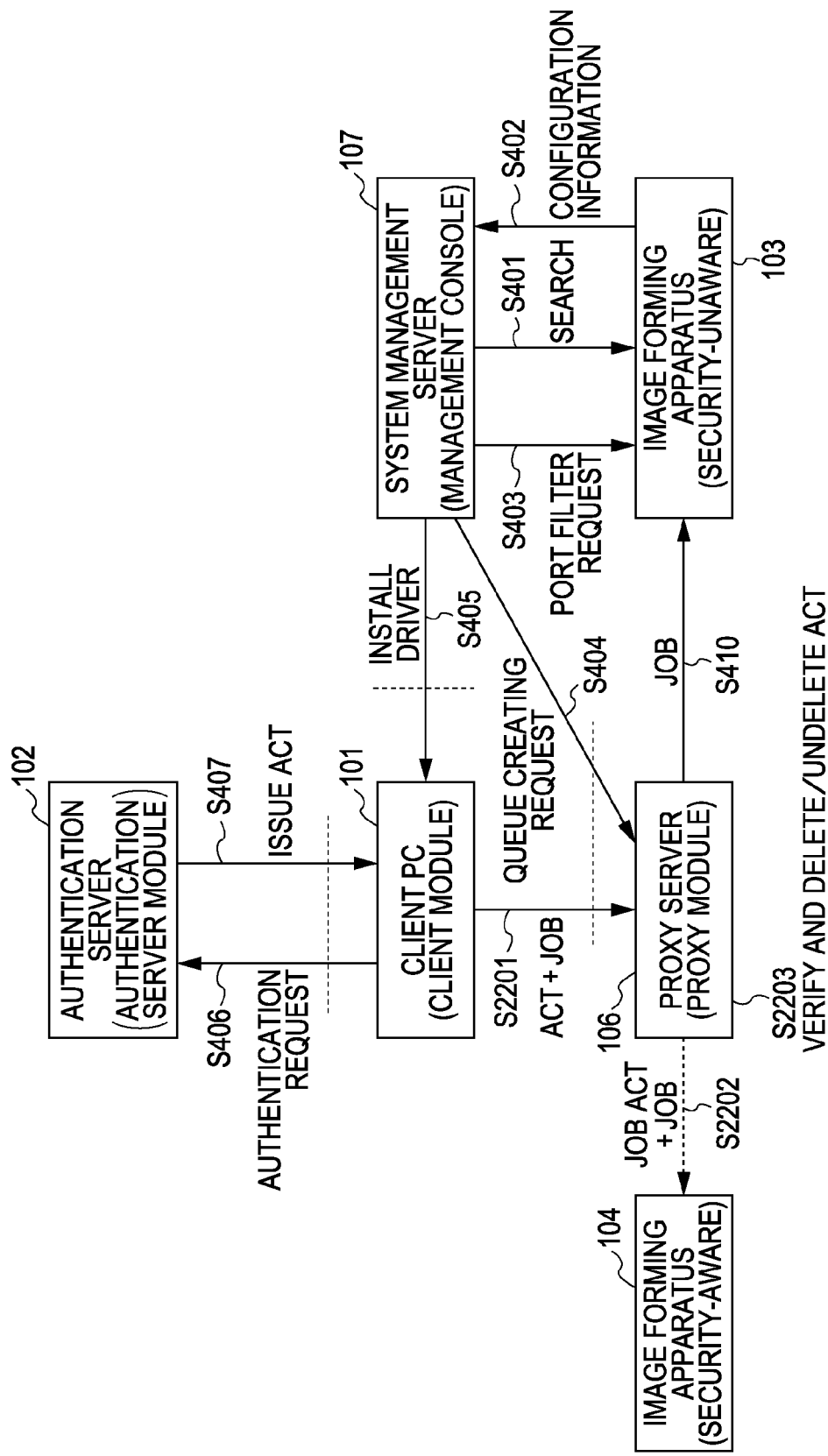
FIG. 22 is a block diagram showing different processing and information flow in the printing system.

FIG. 22 illustrates an outline of a flow of information between apparatuses in a printing system according to the second embodiment. Portions similar to those in FIG. 4 are denoted by identical reference numerals. In particular, differences from FIG. 4 are described below.

In step S2201, regardless of whether an output destination of a print job is an image forming apparatus capable of interpreting an ACT, a print job including an added ACT is transmitted from the client PC 101 to the proxy server 106.

When the output destination of the print job received by the proxy server 106 is the image forming apparatus 104, which can interpret an ACT, in step S2202, the proxy server 106 transmits the print job to the image forming apparatus 104 without deleting the ACT. Alternatively, when the output destination of the print job received by the proxy server 106 is the image forming apparatus 103, which cannot interpret the ACT, similarly to the first embodiment, the proxy server 106 deletes the ACT, and transmits the ACT-deleted print job to the image forming apparatus 103.

Figure 23:
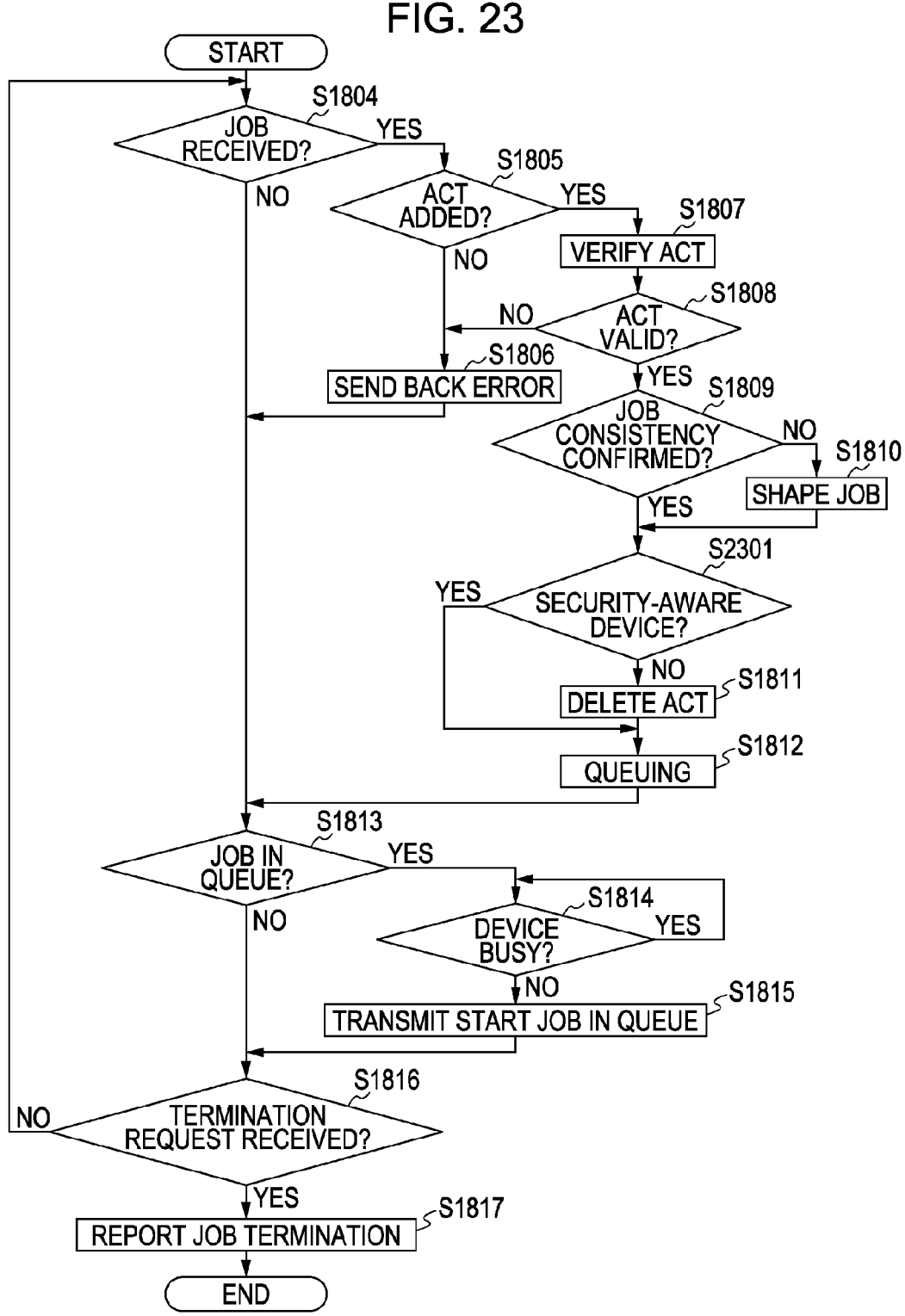
FIG. 23 is a flowchart showing an example of an operation process of the proxy server.

A process of the proxy server 106 in the second embodiment is shown in the flowchart shown in FIG. 23. In FIG. 23, steps similar to those in FIG. 18 are denoted by identical step numbers. A difference from FIG. 18 is shown as step S2301 in FIG. 23. In step S2301, it is determined whether an image forming apparatus to which the print job is transmitted from the proxy server 106 is an image forming apparatus capable of interpreting an ACT. If the image forming apparatus to which the print job is transmitted from the proxy server 106 is an image forming apparatus capable of interpreting the ACT, the print job is queued in the transmission queue without executing ACT deletion. If the image forming apparatus to which the print job is transmitted from the proxy server 106 is not an image forming apparatus capable of interpreting the ACT, ACT deletion is performed and the ACT-deleted print job is queued in the transmission queue.

Third Embodiment

Each of the first and second embodiments describes a case in which an ACT is deleted and the ACT-deleted print job is stored in the transmission queue. The manner of deleting the ACT is not limited thereto.

Figure 24:
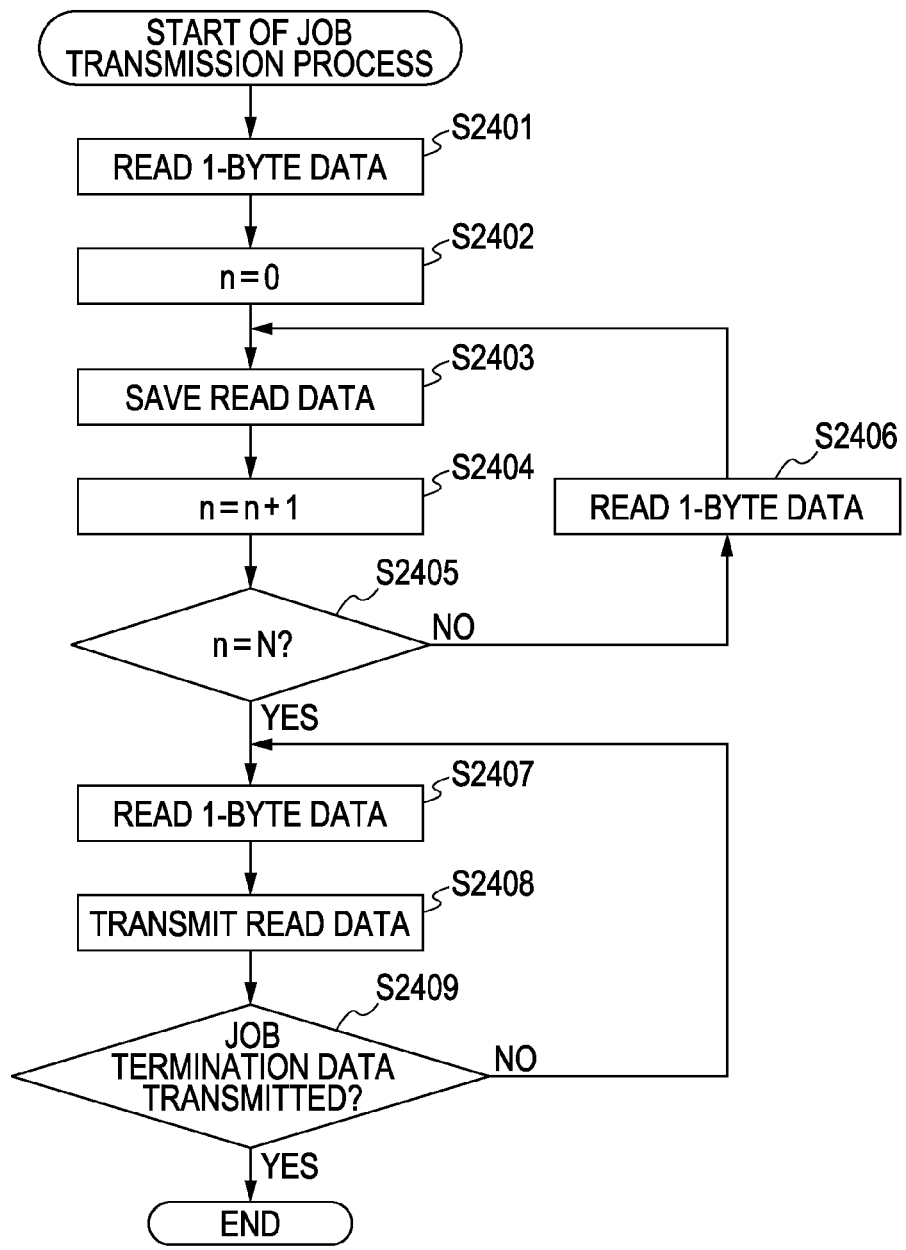
FIG. 24 is a flowchart showing an example of a different access control information deleting process of the proxy server.

FIG. 24 is a flowchart illustrating ACT deletion different from that in each of the first and second embodiments. Differences of FIG. 24 from the flowchart in FIG. 20 are mainly described below.

Although ACT deletion is executed in steps S2401 to S2406, the process in FIG. 24 differs from that in FIG. 20 in that each step is executed in response to the start of the print job transmission process. In other words, in the process in FIG. 24, the ACT has not been deleted at the time the print job is queued in the transmission queue from the proxy server 106, and, when the print job is transmitted, ACT data is excluded from what is to be transmitted. In each of steps S2407 to S2409, transmission of the print job excluding the ACT is realized.

Fourth Embodiment

Each of the above-described embodiments describes a case in which, in the ACT deletion, the ACT is deleted before the proxy server 106 finishes transmitting the print job to the image forming apparatus. The ACT deletion is not limited to this manner.

The image forming apparatus may be controlled to discard the ACT without deleting the ACT by the proxy server 106. For control of the ACT deletion by the proxy server 106, for example, a form in which the ACT is processed so as to be recognized as dummy data by the image forming apparatus, and a form that transmits a command for the image forming apparatus to delete the ACT without processing the ACT can be applied.

Fifth Embodiment

Each of the above-described embodiments describes a case in which, in the job transmission, the job is not transmitted to the image forming apparatus when the proxy server 106 determines that the input access control information is not valid or when the proxy server 106 cannot detect (corresponding to "NO" in step S1805) the access control information. However, the manner of transmission of the job is not limited thereto. The proxy server 106 may record history of the job and transmit the job without deleting the access control information when the access control information is not valid (corresponding to "NO" in step S1808), or when the access control information is not detected (corresponding to "NO" in step S1805) instead of not transmitting the job to the image forming apparatus.

In this case, instead of sending back an error in step S1806 (see FIG. 18), the proxy server 106 records history indicating the print job, which does not have the valid access control information ("NO" in step S1805 or "NO" in step S1808), which is input to the proxy server 106.

On condition of recording the history, the proxy server 106 transmits the job to the image forming apparatus. The recording can be performed at different times. For example, the proxy server 106 can record the history before, after, or during the transmission of the job.

The above-described history includes a plurality of attributes of the job, for example, a job name, a user name of the job, a job execution time, a computer name. In addition, the system management server 107 can acquire the recorded history from the proxy server 106 via the LAN 108, and can display the acquired history on the display screen. By displaying the acquired history, a manager can confirm a history of inappropriate jobs input to the proxy server 106. This deters execution of an inappropriate job at some level.

According to the fifth embodiment, even for an image forming apparatus that cannot be provided with an advanced function of interpreting an ACT or the like, a mechanism for flexibly restricting a print job can be provided even if the access control information is not deleted by the proxy server 106.

In addition, according to the fifth embodiment, a user can designate printing more flexibly compared with each of the above-described embodiments when the access control information is not acquired from the authentication server 102 under a certain reason and urgent printing is required.

Other Embodiments

In order for various devices to operate for realizing the functions of the above-described embodiments, provision of a computer (in an apparatus or system connected to the various devices) with program code of software for realizing the functions is also included within the scope of the present invention. In addition, an embodiment practiced by operating the various devices in accordance with a program stored in the computer (CPU (central processing unit) or MPU (microprocessor unit)) in the apparatus or system is also included in the scope of the present invention.

In addition, in this case, the program code of the software itself realizes the functions of the above-described embodiments. Furthermore, the program code itself, and means for providing the program code with the computer, for example, a recording medium containing the program code, may comprise the present invention. Recording media that contain the program code include, for example, a flexible disk, a hard disk, an optical disk, a magneto-optical disc, a CD-ROM (compact-disc read-only memory), a magnetic tape, a non-volatile memory card, a ROM, and a DVD (digital versatile disc).

In addition, even if the program code realizes the functions of the above-described embodiments in cooperation with an OS (operating system) running on the computer or with different application software, the program code is included in the scope of the present invention.

Furthermore, the provided program code is stored in a memory on a function expansion board of the computer or in a function expansion unit connected to the computer. Definitely, a case in which the functions of the above-described embodiments are realized such that a CPU or the like on the function expansion board or in the function expansion unit performs all or part of actual processing on the basis of instructions of the program code is also included in the present invention.

The above-described embodiments simply represent specific examples of practicing the present invention. As many apparently widely different embodiments of the present invention can be made without departing from the spirit and scope thereof, it is to be understood that the invention is not limited to the specific embodiments thereof except as defined in the claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-141622 filed May 22, 2006, and Japanese Application No. 2007-102944 filed Apr. 10, 2007, which are hereby incorporated by reference herein in their entirety.

What is claimed is:

1. A printing system comprising:
    a job control server for performing print job transmission to an initial image forming apparatus, the job control server comprising:
        a detection unit configured to detect access control information of a print job, the access control information being issued by an external authentication server based on user authentication information;
        a verification unit configured to verify whether or not the access control information detected by the detection unit is issued by the external authentication server;
        a deletion unit configured to perform deleting the access control information detected by the detection unit and verified to be issued by the external authentication server; and
        a transmission unit configured to transmit, to the initial image forming apparatus, the print job with the access control information deleted; and
    a management apparatus comprising:
        a search unit configured to perform a search to find image forming apparatuses;
        an identification unit configured to identify that the found image forming apparatuses cannot verify the access control information;
        a selection unit configured to select one among the image forming apparatuses found by the search unit;
        a setting unit configured to set the selected image forming apparatus as a print job output destination of a proxy server and set the initial image forming apparatus so as to refuse the print job from other than the job control server, if the initial image forming apparatus is identified by the identification unit and is selected; and
        a delivery unit configured to deliver, to an information processing apparatus, a setup program for a printer driver using the job control server as a print job transmission destination to which a print job is transmitted from the information processing apparatus.

2. The printing system according to claim 1, wherein the transmission unit does not transmit, to the initial image forming apparatus, the print job when the determination unit determines that the detected access control information is not valid or when the detection unit does not detect the access control information.

3. The printing system according to claim 1, further comprising a recording unit adapted to record history of the print job which is determined that the access control information is not valid or that the access control information has not been detected; and
    wherein the transmission unit transmits, to the initial image forming apparatus, the print job with the access control information deleted by recording the history by the recording unit.

4. The printing system according to claim 1, wherein the initial image forming apparatus is set so as to reject data input from an apparatus different from the information processing apparatus.

5. The printing system according to claim 1, wherein the transmission unit saves the access control information in a storage section included in the information processing apparatus so that the access control information is not transmitted.

6. The printing system according to claim 1, wherein, when a transmission destination to which the print job is transmitted is capable of interpreting the access control information, the deletion unit transmits the print job without deleting the access control information.

7. The printing system according to claim 1, wherein the detected access control information is valid when time-limit information included in the access control information is within a time limit, or a digital signature representing access control information issuer included in the access control information is identified.

8. The printing system according to claim 1, wherein the deletion unit performs processing so as to allow the initial image forming apparatus to discard the access control information.

9. A non-transitory storage medium storing a program to be executed by a computer that communicates with a job control server for detecting access control information of a print job, the access control information being issued by an external authentication server based on authentication information, verifies whether or not the detected access control information is issued by the external authentication server, deletes the access control information detected and verified to be issued by the external authentication server, and transmits, to an initial image forming apparatus, the print job with the access control information deleted, the program including program code comprising the steps of:
    performing a search to find image forming apparatuses;
    identifying that the found image forming apparatuses cannot verify the access control information;
    selecting one among the image forming apparatuses found in the search;
    setting the selected image forming apparatus as a print job output destination of a proxy server and setting the initial image forming apparatus so as to refuse the print job from other than the job control server, if the initial image forming apparatus is identified and is selected; and
    delivering, to an information processing apparatus, a setup program for a printer driver using the job control server as a print job transmission destination to which a print job is transmitted from the information processing apparatus.

10. The medium according to claim 9, wherein, in the transmitting step, the print job is not transmitted to the initial image forming apparatus when the determination step determines that the detected access control information is not valid or when the detection step does not detect the access control information.

11. The medium according to claim 9, further comprising the step of:
   recording history of the print job which is determined that the access control information is not valid or which the access control information is not been detected; and
   wherein transmission step transmits, to the initial image forming apparatus, the print job with the access control information deleted by recording the history.

12. The medium according to claim 9, wherein the initial image forming apparatus is set so as to reject data input from an apparatus different from the computer that transmits the print job with the access control information deleted.

13. The medium according to claim 9, wherein, in the transmitting step, the identified access control information is saved in a storage unit so that the access control information is not transmitted.

14. The medium according to claim 9, wherein, in the deleting step, when a print job transmission destination to which the print job is transmitted is capable of interpreting the access control information, the print job is transmitted without deleting the access control information.

15. The medium according to claim 9, wherein the access control information is valid when time-limit information included in the access control information is within a time limit, or a digital signature representing an access control information issuer included in the access control information is identified.

16. The medium according to claim 9, wherein the access control information is processed by the computer so that the initial image forming apparatus discards the access control information.

17. The medium according to claim 9, further comprising the steps of:
   searching to find an image forming apparatus that does not match the access control information;
   setting the found image forming apparatus as a print job output destination to which the print job is transmitted from the computer; and
   delivering, to the information processing apparatus, a setup program for a printer driver using the computer as a print job transmission destination to which the print job is transmitted.

* * * * *